United States Patent
Faccin

(10) Patent No.: US 10,779,345 B2
(45) Date of Patent: Sep. 15, 2020

(54) USER PLANE RELOCATION TECHNIQUES IN WIRELESS COMMUNICATION SYSTEMS

(71) Applicant: QUALCOMM Incorporated, San Diego, CA (US)

(72) Inventor: Stefano Faccin, San Ysidro, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 15/900,532

(22) Filed: Feb. 20, 2018

(65) Prior Publication Data

US 2018/0270888 A1 Sep. 20, 2018

Related U.S. Application Data

(60) Provisional application No. 62/473,904, filed on Mar. 20, 2017.

(51) Int. Cl.
| | |
|---|---|
| *H04W 76/15* | (2018.01) |
| *H04W 76/20* | (2018.01) |
| *H04W 36/22* | (2009.01) |
| *H04W 88/08* | (2009.01) |
| *H04W 88/02* | (2009.01) |
| *H04W 76/11* | (2018.01) |

(52) U.S. Cl.
CPC .......... *H04W 76/15* (2018.02); *H04W 36/22* (2013.01); *H04W 76/20* (2018.02); *H04W 76/11* (2018.02); *H04W 88/02* (2013.01); *H04W 88/08* (2013.01)

(58) Field of Classification Search
CPC .................................................. H04W 76/15
See application file for complete search history.

(56) References Cited

U.S. PATENT DOCUMENTS

| | | | | |
|---|---|---|---|---|
| 2011/0061000 | A1* | 3/2011 | Andreasson | G06F 21/43 715/741 |
| 2014/0092736 | A1* | 4/2014 | Baillargeon | H04W 72/1226 370/230 |
| 2014/0279454 | A1* | 9/2014 | Raman | H04L 63/08 705/40 |

(Continued)

FOREIGN PATENT DOCUMENTS

| | | | | |
|---|---|---|---|---|
| EP | 2866494 A1 | * | 4/2015 | ........ H04W 36/0055 |
| EP | 3002986 A1 | | 4/2016 | |

OTHER PUBLICATIONS

International Search Report and Written Opinion—PCT/US2018/019217—ISA/EPO—dated Jul. 4, 2018.

*Primary Examiner* — Samina F Choudhry
(74) *Attorney, Agent, or Firm* — Holland & Hart LLP

(57) ABSTRACT

Techniques for modification of data sessions may allow changing of user plane functions (UPFs) that serve a data session. A UE may identify a user plane of a first data session is to be relocated from a first UPF, and may initiate a second data session with a second UPF using an identification associated with the first data session. In some cases, the first data session may be modified to be served by the second UPF rather than the first UPF. A network entity, such as a session management function (SMF) may determine that a user plane of a first data session of a UE is to be relocated away from a first UPF, and may perform a user plane relocation of the first data session via establishing a second data session at a second UPF or via modifying the first data session to be served by a second UPF.

64 Claims, 18 Drawing Sheets

(56) References Cited

U.S. PATENT DOCUMENTS

2017/0289270 A1* 10/2017 Li ..................... H04L 41/0803
2017/0339609 A1* 11/2017 Youn .................... H04W 76/11
2018/0115928 A1*  4/2018 Kim ................. H04W 36/0061

* cited by examiner

USER PLANE RELOCATION TECHNIQUES IN WIRELESS COMMUNICATION SYSTEMS

CROSS REFERENCES

The present application for patent claims priority to U.S. Provisional Patent Application No. 62/473,904 by Faccin, entitled "User Plane Relocation Techniques in Wireless Communication Systems," filed Mar. 20, 2017, assigned to the assignee hereof.

INTRODUCTION

The following relates generally to wireless communication and more specifically to user plane relocation for a user equipment with different session and service continuity modes.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Some wireless communications systems (e.g., NR systems) may include a core network in communication with a UE. In some examples, the core network may provide various services for a UE connected to the core network, which may include the UE being connected to a base station. Specifically, the core network may support mobility management services, session management services, and other operations associated with a UE. In some cases, the functions or entities providing these different services may be changed or modified based on, for example, movement of a UE within a network.

SUMMARY

A method of wireless communication is described. The method may include establishing, by a UE, a first data session with a first user plane function (UPF) of a network, receiving, at the UE, a request to establish a second data session with the network, and establishing, by the UE and in response to receiving the request, the second data session with a second UPF of the network.

An apparatus for wireless communication is described. The apparatus may include a processor, memory in electronic communication with the processor, and instructions stored in the memory. The instructions may be operable to cause the processor to establish, by a UE, a first data session with a first UPF of a network, receive, at the UE, a request to establish a second data session with the network, and establish, by the UE and in response to receiving the request, the second data session with a second UPF of the network.

A non-transitory computer-readable medium for wireless communication is described. The non-transitory computer-readable medium may include instructions operable to cause a processor to establish, by a UE, a first data session with a first UPF of a network, receive, at the UE, a request to establish a second data session with the network, and establish, by the UE and in response to receiving the request, the second data session with a second UPF of the network.

Some examples of the method, apparatus, and non-transitory computer-readable medium described above may further include processes, features, means, or instructions for releasing, after establishing the second data session, the first data session with the first UPF.

In some examples of the method, apparatus, and non-transitory computer-readable medium described above, establishing the second data session includes: transmitting to the network a protocol data unit (PDU) session establishment request for establishment of the second data session that includes a data session identification associated with the first data session.

In some examples of the method, apparatus, and non-transitory computer-readable medium described above, establishing the second data session with the second UPF further includes transmitting an indication that the PDU session establishment request may be for a user plane relocation.

Some examples of the method, apparatus, and non-transitory computer-readable medium described above may further include processes, features, means, or instructions for receiving a confirmation from the network that the second data session may be established. Some examples of the method, apparatus, and non-transitory computer-readable medium described above may further include processes, features, means, or instructions for receiving user plane information associated with the second data session from the second UPF.

In some examples of the method, apparatus, and non-transitory computer-readable medium described above, the first data session may be established as a first PDU session with the first UPF.

In some examples of the method, apparatus, and non-transitory computer-readable medium described above, the request may be received from a session management function (SMF) of the network.

In some examples of the method, apparatus, and non-transitory computer-readable medium described above, the request includes a first data session correlation identification.

A method of wireless communication is described. The method may include determining that a user plane of a first data session of a UE is to be relocated away from a first UPF and performing a user plane relocation of the first data session via establishing a second data session at a second UPF.

An apparatus for wireless communication is described. The apparatus may include a processor, memory in electronic communication with the processor, and instructions stored in the memory. The instructions may be operable to cause the processor to determine that a user plane of a first data session of a UE is to be relocated away from a first UPF and perform a user plane relocation of the first data session via establishing a second data session at a second UPF.

A non-transitory computer-readable medium for wireless communication is described. The non-transitory computer-readable medium may include instructions operable to cause a processor to determine that a user plane of a first data session of a UE is to be relocated away from a first UPF and perform a user plane relocation of the first data session via establishing a second data session at a second UPF.

Some examples of the method, apparatus, and non-transitory computer-readable medium described above may further include processes, features, means, or instructions for sending the UE a request to establish the second data session.

In some examples of the method, apparatus, and non-transitory computer-readable medium described above, the request to establish the second data session includes a first data session correlation identification.

In some examples of the method, apparatus, and non-transitory computer-readable medium described above, performing the user plane relocation includes: receiving a request from the UE to establish the second data session, the request including a first data session identification. Some examples of the method, apparatus, and non-transitory computer-readable medium described above may further include processes, features, means, or instructions for determining that the request requires a UPF relocation away from the first UPF serving the first data session based at least in part on the first data session identification provided by the UE. Some examples of the method, apparatus, and non-transitory computer-readable medium described above may further include processes, features, means, or instructions for establishing the second data session with the second UPF.

In some examples of the method, apparatus, and non-transitory computer-readable medium described above, determining that the request requires the UPF relocation includes: receiving, in the request from the UE, a cause indication that the second data session establishment may be for a user plane relocation.

Some examples of the method, apparatus, and non-transitory computer-readable medium described above may further include processes, features, means, or instructions for establishing a connection with the second UPF.

Some examples of the method, apparatus, and non-transitory computer-readable medium described above may further include processes, features, means, or instructions for transmitting, to the UE, user plane information associated with the second data session and the second UPF.

In some examples of the method, apparatus, and non-transitory computer-readable medium described above, the method may be performed at a SMF of a network.

A method of for wireless communication is described. The method may include identifying, at a user equipment (UE), that a user plane of a first data session with a network is to be relocated from a first user plane function (UPF) to a second UPF, initiating a second data session using an identification associated with the first data session, and establishing the second data session with a second UPF.

An apparatus for wireless communication is described. The apparatus may include means for identifying, at a UE, that a user plane of a first data session with a network is to be relocated from a first UPF to a second UPF, means for initiating a second data session using an identification associated with the first data session, and means for establishing the second data session with a second UPF.

Another apparatus for wireless communication is described. The apparatus may include a processor, memory in electronic communication with the processor, and instructions stored in the memory. The instructions may be operable to cause the processor to identify, at a UE, that a user plane of a first data session with a network is to be relocated from a first UPF to a second UPF, initiate a second data session using an identification associated with the first data session, and establish the second data session with a second UPF.

A non-transitory computer readable medium for wireless communication is described. The non-transitory computer-readable medium may include instructions operable to cause a processor to identify, at a UE, that a user plane of a first data session with a network is to be relocated from a first UPF to a second UPF, initiate a second data session using an identification associated with the first data session, and establish the second data session with a second UPF.

Some examples of the method, apparatus, and non-transitory computer-readable medium described above may further include processes, features, means, or instructions for releasing, after the establishing the second data session, the first data session with the first UPF. In some examples of the method, apparatus, and non-transitory computer-readable medium described above, the initiating the second data session comprises transmitting to the network a protocol data unit (PDU) session establishment request for establishment of the second data session that includes one or more of the identification associated with the first data session or a first data session correlation identification. In some examples of the method, apparatus, and non-transitory computer-readable medium described above, the initiating the second data session with the second UPF further comprises transmitting an indication that the PDU session establishment request is for a user plane relocation.

Some examples of the method, apparatus, and non-transitory computer-readable medium described above may further include processes, features, means, or instructions for receiving a confirmation from the network that the second data session is established. Some examples of the method, apparatus, and non-transitory computer-readable medium described above may further include processes, features, means, or instructions for receiving user plane information associated with the second data session from the second UPF.

Some examples of the method, apparatus, and non-transitory computer-readable medium described above may further include processes, features, means, or instructions for establishing, prior to the identifying, the first data session as a first PDU session with the first UPF. In some examples of the method, apparatus, and non-transitory computer-readable medium described above, the identifying that the first data session is to be relocated comprises receiving a request to relocate the user plane of the first data session. In some examples of the method, apparatus, and non-transitory computer-readable medium described above, the request to relocate may be received from a session management function (SMF) of the network. In some examples of the method, apparatus, and non-transitory computer-readable medium described above, the request includes a first data session correlation identification.

A method of for wireless communication is described. The method may include determining that a user plane of a first data session of a UE is to be relocated away from a first UPF and performing a user plane relocation of the first data session via establishing a second data session at a second UPF.

An apparatus for wireless communication is described. The apparatus may include means for determining that a user plane of a first data session of a UE is to be relocated away from a first UPF and means for performing a user plane relocation of the first data session via establishing a second data session at a second UPF.

Another apparatus for wireless communication is described. The apparatus may include a processor, memory in electronic communication with the processor, and instructions stored in the memory. The instructions may be operable to cause the processor to determine that a user plane of a first data session of a UE is to be relocated away from a first UPF and perform a user plane relocation of the first data session via establishing a second data session at a second UPF.

A non-transitory computer readable medium for wireless communication is described. The non-transitory computer-readable medium may include instructions operable to cause a processor to determine that a user plane of a first data session of a UE is to be relocated away from a first UPF and perform a user plane relocation of the first data session via establishing a second data session at a second UPF.

Some examples of the method, apparatus, and non-transitory computer-readable medium described above may further include processes, features, means, or instructions for sending the UE a request to relocate the user plane of the first data session. In some examples of the method, apparatus, and non-transitory computer-readable medium described above, the request to relocate the user plane includes a first data session correlation identification.

Some examples of the method, apparatus, and non-transitory computer-readable medium described above may further include processes, features, means, or instructions for receiving a request from a UE to establish a second data session, the request including a first data session identification. Some examples of the method, apparatus, and non-transitory computer-readable medium described above may further include processes, features, means, or instructions for determining that the request is for a UPF relocation away from a first UPF serving the first data session based at least in part on the first data session identification provided by the UE. Some examples of the method, apparatus, and non-transitory computer-readable medium described above may further include processes, features, means, or instructions for establishing the second data session with the second UPF.

In some examples of the method, apparatus, and non-transitory computer-readable medium described above, the determining that the request may be for the UPF relocation comprises receiving, in the request from the UE, a cause indication that the second data session establishment is for a user plane relocation. Some examples of the method, apparatus, and non-transitory computer-readable medium described above may further include processes, features, means, or instructions for establishing a connection with the second UPF.

Some examples of the method, apparatus, and non-transitory computer-readable medium described above may further include processes, features, means, or instructions for transmitting, to the UE, user plane information associated with the second data session and the second UPF. In some examples of the method, apparatus, and non-transitory computer-readable medium described above, the method may be performed at a SMF of a network.

A method of for wireless communication is described. The method may include identifying that a user plane of a first data session with a network is to be relocated from a first UPF, initiating a modification of the first data session to be relocated using an identification associated with the first data session, and receiving a confirmation of relocation of the first data session to a second UPF.

An apparatus for wireless communication is described. The apparatus may include means for identifying that a user plane of a first data session with a network is to be relocated from a first UPF, means for initiating a modification of the first data session to be relocated using an identification associated with the first data session, and means for receiving a confirmation of relocation of the first data session to a second UPF.

Another apparatus for wireless communication is described. The apparatus may include a processor, memory in electronic communication with the processor, and instructions stored in the memory. The instructions may be operable to cause the processor to identify that a user plane of a first data session with a network is to be relocated from a first UPF, initiate a modification of the first data session to be relocated using an identification associated with the first data session, and receive a confirmation of relocation of the first data session to a second UPF.

A non-transitory computer readable medium for wireless communication is described. The non-transitory computer-readable medium may include instructions operable to cause a processor to identify that a user plane of a first data session with a network is to be relocated from a first UPF, initiate a modification of the first data session to be relocated using an identification associated with the first data session, and receive a confirmation of relocation of the first data session to a second UPF.

In some examples of the method, apparatus, and non-transitory computer-readable medium described above, the initiating the modification of the first data session comprises transmitting a PDU session modification request for relocation of the first data session, the PDU session modification request including a first data session identification of the first data session. In some examples of the method, apparatus, and non-transitory computer-readable medium described above, the PDU session modification request further includes a first data session correlation identification. Some examples of the method, apparatus, and non-transitory computer-readable medium described above may further include processes, features, means, or instructions for transmitting an indication that the PDU session modification request is for a user plane relocation.

Some examples of the method, apparatus, and non-transitory computer-readable medium described above may further include processes, features, means, or instructions for receiving a confirmation from the second UPF that the first data session is established at the second UPF. Some examples of the method, apparatus, and non-transitory computer-readable medium described above may further include processes, features, means, or instructions for receiving user plane information associated with the second UPF.

Some examples of the method, apparatus, and non-transitory computer-readable medium described above may further include processes, features, means, or instructions for establishing, prior to the identifying, the first data session as a PDU session with the first UPF. In some examples of the method, apparatus, and non-transitory computer-readable medium described above, the identifying that the first data session is to be relocated comprises receiving a request to relocate from the first UPF to the second UPF. In some examples of the method, apparatus, and non-transitory computer-readable medium described above, the request to relocate may be received from a SMF of the network.

A method of for wireless communication is described. The method may include determining that a user plane of a first data session of a UE is to be relocated away from a first UPF and performing a user plane relocation of the first data session via modifying the first data session to be served by a second UPF.

An apparatus for wireless communication is described. The apparatus may include means for determining that a user plane of a first data session of a UE is to be relocated away from a first UPF and means for performing a user plane relocation of the first data session via modifying the first data session to be served by a second UPF.

Another apparatus for wireless communication is described. The apparatus may include a processor, memory in electronic communication with the processor, and instructions stored in the memory. The instructions may be operable to cause the processor to determine that a user plane of a first data session of a UE is to be relocated away from a first UPF and perform a user plane relocation of the first data session via modifying the first data session to be served by a second UPF.

A non-transitory computer readable medium for wireless communication is described. The non-transitory computer-readable medium may include instructions operable to cause a processor to determine that a user plane of a first data session of a UE is to be relocated away from a first UPF and perform a user plane relocation of the first data session via modifying the first data session to be served by a second UPF.

Some examples of the method, apparatus, and non-transitory computer-readable medium described above may further include processes, features, means, or instructions for sending the UE a request to relocate the user plane of the first data session. In some examples of the method, apparatus, and non-transitory computer-readable medium described above, the request to relocate the user plane includes a first data session correlation identification.

Some examples of the method, apparatus, and non-transitory computer-readable medium described above may further include processes, features, means, or instructions for receiving a request from a UE to modify a first data session, the request including a first data session identification. Some examples of the method, apparatus, and non-transitory computer-readable medium described above may further include processes, features, means, or instructions for determining that the request is for a UPF relocation away from the first UPF serving the first data session based at least in part on the first data session identification provided by the UE. Some examples of the method, apparatus, and non-transitory computer-readable medium described above may further include processes, features, means, or instructions for selecting the second UPF for the modified first data session.

In some examples of the method, apparatus, and non-transitory computer-readable medium described above, the determining that the request is for the UPF relocation comprises receiving, in the request from the UE, a cause indication that the request is for a user plane relocation. In some examples of the method, apparatus, and non-transitory computer-readable medium described above, the request includes a first data session correlation identification.

Some examples of the method, apparatus, and non-transitory computer-readable medium described above may further include processes, features, means, or instructions for establishing a connection with the second UPF. Some examples of the method, apparatus, and non-transitory computer-readable medium described above may further include processes, features, means, or instructions for transmitting, to the UE, user plane information associated with the second UPF. Some examples of the method, apparatus, and non-transitory computer-readable medium described above may further include processes, features, means, or instructions for triggering a session release at the first UPF. In some examples of the method, apparatus, and non-transitory computer-readable medium described above, the method may be performed at a session management function (SMF) of a network.

DETAILED DESCRIPTION

Figure 1:
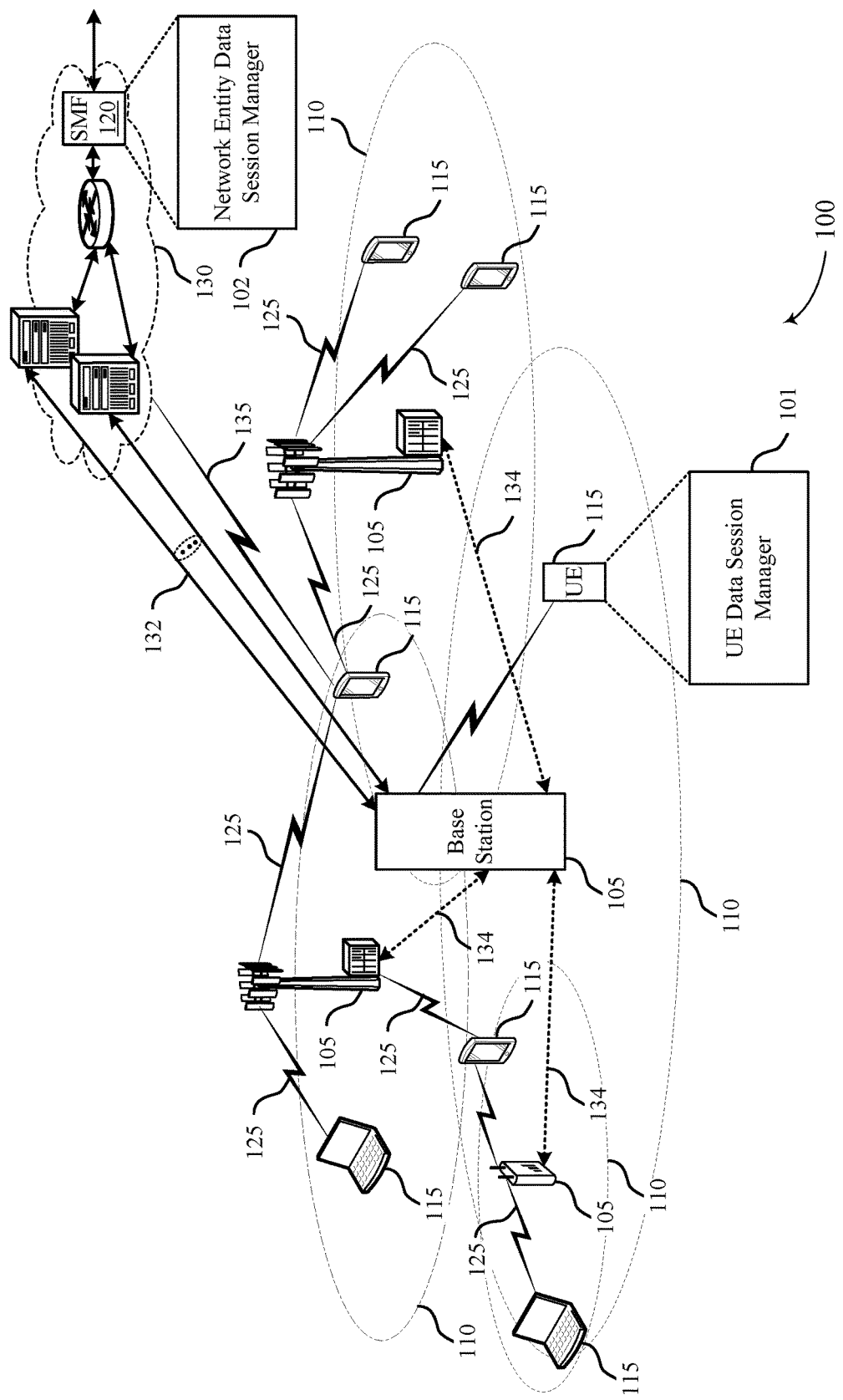
FIG. 1 illustrates an example of a wireless communications system that supports user plane relocation for a UE with different session and service continuity modes in accordance with one or more aspects of the present disclosure.

A wireless communications system (e.g., a 5G or a NR system) may include a core network in communication with a base station and/or a UE. The functions of the core network may be virtualized to allow for a more flexible architecture. Specifically, a core network may include several entities (e.g., functions) such as access and mobility management functions (AMFs), session management functions (SMFs), user plane functions (UPFs), and others, that may be virtually implemented in software. A UPF may provide functionality for serving as the point of interconnect to data network (DN) for a data session (e.g., a PDU session). In addition, in the wireless communications system (e.g., a 5G or a NR system), a UE may be in a connected mode with an entity of the core network and/or a base station and may have different session and service continuity modes with one or more of the entities. In some cases, it may be desirable for a UE with an established data session served by a first UPF to have the data session served by a different UPF (e.g., as a result of movement of the UE).

Some wireless communication systems may support techniques for modification of data sessions such as through changing UPFs that serve a data session. Specifically, in some examples, the UE may identify a user plane of a first data session with a network that is to be relocated from a first UPF to a different UPF. In some examples, a SMF may transmit a request to the UE that requests the UE relocate a data session served by the first UPF away from the first UPF. The UE may initiate a second data session using an identification associated with the first data session, and establish the second data session with a second UPF responsive to the request to relocate the data session. In some cases, the second data session may be established with the second UPF, and the UE may release the first data session with the first UPF. In some cases, the first data session may be modified to be served by the second UPF rather than the first UPF.

In some cases, a SMF may determine that a user plane of a first data session of a UE is to be relocated away from a first UPF, and may perform a user plane relocation of the first data session via establishing a second data session at a second UPF. In some cases, the SMF may send the UE a request to relocate the user plane of the first data session and, responsive thereto, receive a request to relocate the user plane, which may include a first data session correlation indicator. In some cases, the SMF may receive a request from the UE to establish a second data session, and a second data session may be established using a data session identification associated with the first data session. In other cases, the SMF may determine that a user plane of a first data session of a UE is to be relocated away from a first UPF, and perform user plane relocation of the first data session via modifying the first data session to be served by a second UPF.

Aspects of the disclosure introduced above are described below in the context of wireless communications systems. Examples of processes and signaling exchanges that support user plane relocation for a UE with different session and service continuity modes are then described. Aspects of the disclosure are further illustrated by and described with reference to apparatus diagrams, system diagrams, and flowcharts that relate to user plane relocation for a UE with different session and service continuity modes.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a LTE (or LTE-Advanced) network, or an NR network. In some cases, wireless communications system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. A UE 115 may communicate with the core network 130 through communication link 135. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In wireless communications system 100, one base station 105 or a group of base stations 105 may be referred to as a radio access network (RAN) 105.

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

Base stations 105 may communicate with the core network 130 and with one another. For example, base stations 105 may interface with the core network 130 through backhaul links 132 (e.g., S1). Base stations 105 may communicate with one another over backhaul links 134 (e.g., X2) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as gNodeBs (gNBs) 105.

The core network 130 may provide user authentication, access authorization, tracking, Internet Protocol (IP) connectivity, and other access, routing, or mobility functions. One exemplary function of the core network 130 may be SMF 120, which may provide session management services for UEs 115. Specifically, SMF 120 may establish, modify, and release sessions (or bearers) for communication between UEs 115 and a data network. For example, SMF 120 may maintain a tunnel for communication between a UPF and an access network (AN) node. In addition, SMF 120 may allocate and manage IP addresses for UEs 115, select and control user plane functions, configure traffic steering at the UPF to route traffic to proper destinations, terminate SM parts of non-access stratum (NAS) messages, provide roaming functionality, etc.

In some examples, one or more base stations 105 may include subcomponents such as an access network entity, which may be an example of an access node controller (ANC). Each access network entity may communicate with a number of UEs 115 through a number of other access network entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

UEs 115 may include a UE data session manager 101, which may identify a user plane of a first data session with a network is to be relocated from a first UPF to a different UPF. In some examples, a SMF 120 may transmit a request to the UE 115 that requests the UE 115 relocate a data session served by the first UPF away from the first UPF. The UE 115 may initiate a second data session using an identification associated with the first data session, and establish the second data session with a second UPF responsive to the request to relocate the data session. In some cases, the second data session may be established with the second UPF, and the UE 115 may release the first data session with the first UPF. In some cases, the first data session may be modified to be served by the second UPF rather than the first UPF.

SMF 120 may include a core network entity data session manager 102, which may, in some cases, determine that a user plane of a first data session of a UE 115 is to be relocated away from a first UPF and may perform a user plane relocation of the first data session via establishing a second data session at a second UPF. In some cases, the SMF 120 may send the UE a request to relocate the user plane of the first data session and, responsive thereto, receive a request to relocate the user plane, which may include a first data session correlation indicator. In some cases, the SMF 120 may receive a request from the UE 115 to establish a second data session, and a second data session may be established using a data session identification associated with the first data session. In other cases, the SMF 120 may determine that a user plane of a first data session of a UE 115 is to be relocated away from a first UPF and perform user plane relocation of the first data session via modifying the first data session to be served by a second UPF.

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARM) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In wireless communications system 100 (e.g., a 5G system), the functions of the core network 130 may be virtualized to allow for a more flexible architecture. Specifically, a core network may include several entities (or functions) such as AMFs, SMFs, UPFs, etc. implemented in software. In addition, in the wireless communications system (e.g., 5G system), a UE 115 may be in a connected mode with a base station 105 and a data session (e.g., a PDU session) of a wireless service may be served with a first UPF. It may be determined that the data session is to be relocated to a second UPF, such as based on the UE 115 moving within the wireless communications system 100. Wireless communications system 100 may support techniques for efficient UPF relocations between a UE 115 and different UPF entities (or functions) of core network 130.

Figure 2:
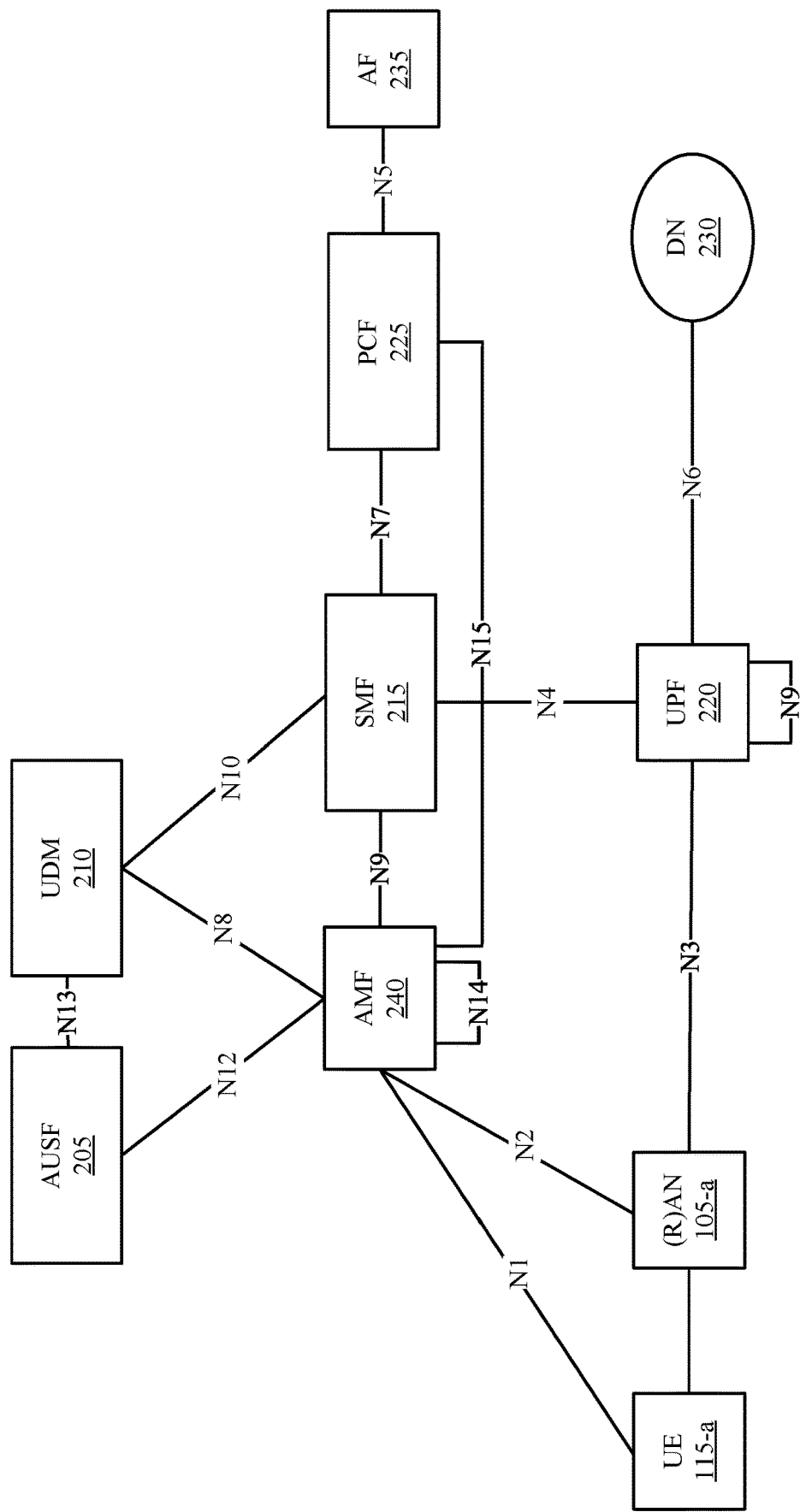
FIG. 2 illustrates an example of a wireless communications system that supports user plane relocation for a UE with different session and service continuity modes in accordance with one or more aspects of the present disclosure.

FIG. 2 illustrates an example of a wireless communications system architecture 200 that supports user plane relocation for a UE with different session and service continuity modes in accordance with one or more aspects of the present disclosure. Wireless communications system architecture 200 may include UE 115-*a*, (R)AN 105-*a* (which may be an example of a base station 105 of FIG. 1), and SMF 215, which may be examples of the corresponding devices described with reference to FIG. 1. Wireless communications system architecture 200 may also include one or more authentication server functions (AUSFs) 205, unified data management (UDM) entities 210, user plane functions (UPFs) 220 (e.g., in communication with a data network (DN) 230), policy control functions (PCFs) 225, and authorization functions (AFs) 235. In addition, wireless communications system architecture 200 may include other functions or entities not displayed within the figure, or may not include one or more of the functions or entities shown.

The AUSF 205 may provide authentication services for UE 115-*a*. For example, AUSF 205 may initiate authentication of UE 115-*a* and provide NAS security functions for a UE 115-*a* based on a request from AMF 240 over communication link N12. In some cases, the authentication and security function may be based on information stored in an entity 210 (e.g., a UDM). Entity 210 (e.g., a UDM) may support an authentication credential repository and processing function (ARPF) that stores the long-term security credentials used in authentication. The AUSF 205 may retrieve information from the entity 210 (e.g., UDM) over communication link N13.

The SMF 215 may provide session management services for UE 115-*a*. Specifically, SMF 215 may establish, modify, and release sessions (or bearers) for communication between UE 115-*a* and DN 230. For example, SMF 215 may maintain a tunnel for communication between UPF 220 and an access network (AN) node. In addition, SMF 215 may allocate and manage IP addresses for UE 115-*a*, select and control user plane functions, configure traffic steering at UPF 220 to route traffic to proper destinations, terminate SM parts of NAS messages, provide roaming functionality, etc. In some cases, the SMF 215 may determine that a PDU service is to be relocated between two UPFs 220, and may initiate a relocation.

The UPF 220 may include functionality for serving as the point of interconnect to DN 230 for an external PDU session. In some cases, UPF 220 may be the anchor point for intra-RAT and inter-RAT mobility. UPF 220 may route and forward packets to and from DN 230, inspect packets and enforce policy rules in the user plane, report traffic usage, handle quality of service (QoS) for user plane packets, verify uplink traffic, etc. The PCF 225 may support unified policy framework to govern the behavior of the network. Specifically, PCF 225 may provide policy rules to control plane functions to enforce them. In some cases, PCF 225 may retrieve subscription information from a subscription repository at entity 210 (e.g., a UDM). AF 235 may support services for authorizing a UE 115-*a* for access to a network.

In some wireless systems (e.g., a 5G wireless system), a UE 115-*a* may access a DN 230 to exchange data packets using a data session or a PDU session. The PDU session may provide a PDU connectivity service, which may support the transmission of one or more PDUs between UE 115-*a* and the DN 230. An association between UE 115-*a* and the DN 230 in a PDU session may use internet protocol (IP) or Ethernet, or the association may be unstructured. In some cases, DN 230 may be an example of a local DN, central DN, public land mobile networks (PLMNs), etc.

As illustrated, the different functions of a core network may be virtualized to support a more flexible architecture. That is, the different functions described above may be implemented in software. In such cases, a UE 115-*a* may communicate with DN 230, SMF 215, PCF 225, etc. via the N3 communication link between (R)AN 105-*a* and UPF 220. The N3 communication link may be referred to as a data connection for the UE 115-*a*. In some cases, it may be desirable to switch a PDU session from one UPF 220 to a different UPF 220. For example, mobility of UE 115-*a* may result in a handover from a source (R)AN 105-*a* to a target (R)AN, and it may be more efficient to have a PDU session established with a first UPF 220 to be relocated to a second UPF 220 that may be in closer proximity to the target (R)AN (e.g., if DN 230 may be a local DN and the target (R)AN also has corresponding data stored at an associated local DN).

Wireless communications system architecture 200 may support modification of PDU sessions such as through changing UPFs 220 that serve a PDU session. Specifically, in some examples, the UE 115-*a* may identify a user plane of a first PDU session with a network is to be relocated from a first UPF to a different UPF. In some examples, SMF 215 may transmit a request to the UE 115-*a* that requests the UE 115-*a* relocate the PDU session served by the first UPF 220 away from the first UPF. The UE may initiate a second PDU session using an identification associated with the first PDU session, and establish the second PDU session with a second UPF (not shown) responsive to the request to relocate the PDU session. In some cases, the second PDU session may be established with the second UPF, and the UE 115-*a* may release the first PDU session with the first UPF 220. In some cases, the first PDU session may be modified to be served by the second UPF rather than the first UPF.

As indicated above, in some cases, SMF 215 may determine that a user plane of the first PDU session is to be relocated away from a first UPF 220, and may perform a user plane relocation of the first PDU session via establishing the second PDU session at the second UPF. In some cases, the SMF 215 may send the UE 115-*a* a request to relocate the user plane of the first PDU session and, responsive thereto, receive a request to relocate the user plane, which may include a first PDU session correlation indicator. In some cases, the SMF 215 may receive a request from the UE 115-*a* to establish a second PDU session, and a second PDU session may be established using a PDU session identification associated with the first PDU session. In other cases, the SMF 215 may determine that a user plane of a first PDU session of a UE 115-*a* is to be relocated away from a first UPF 220, and perform user plane relocation of the first PDU session via modifying the first PDU session to be served by a second UPF.

Figure 3:
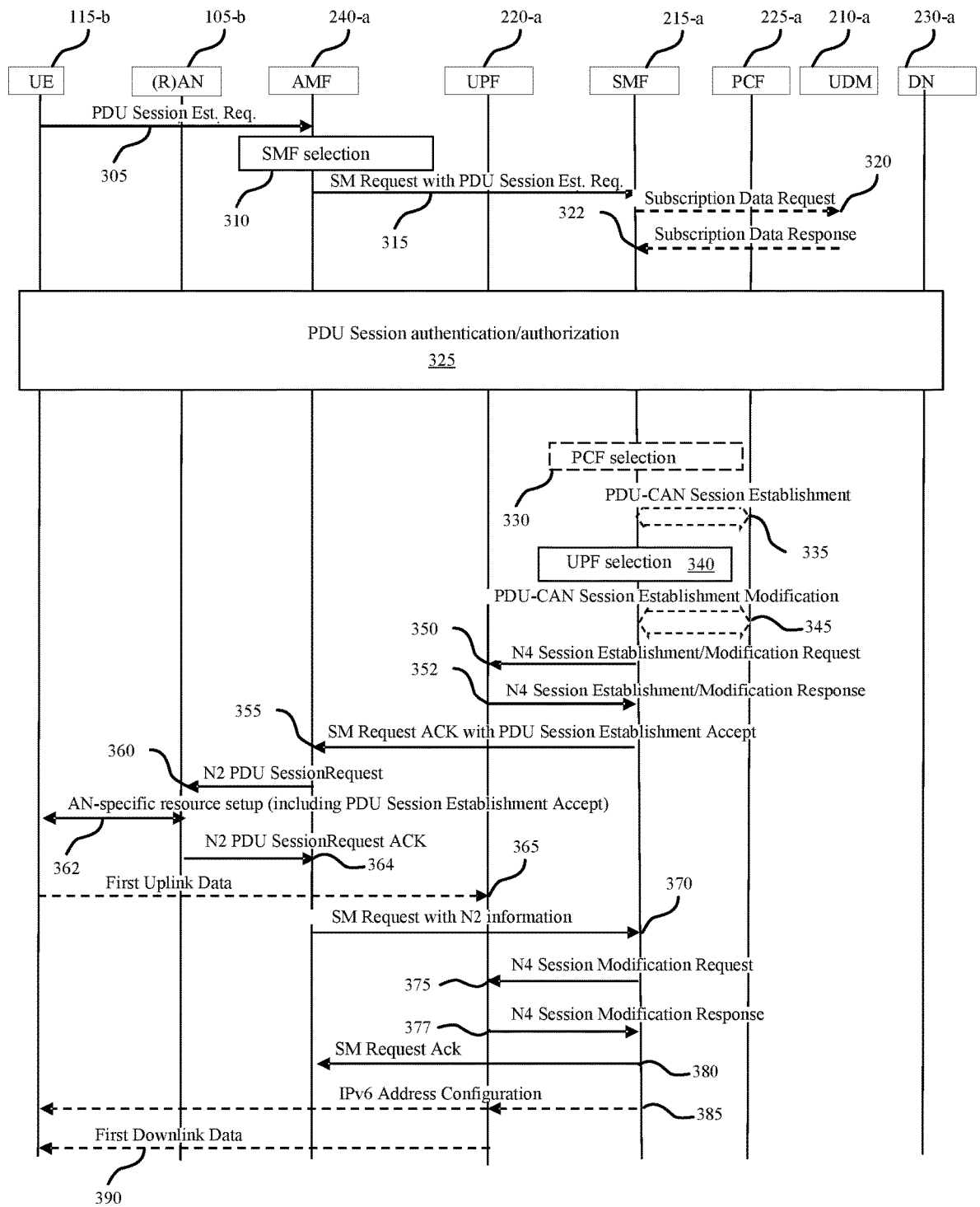
FIGS. 3-6 illustrate examples of process flows in systems supporting user plane relocation for a UE with different session and service continuity modes in accordance with one or more aspects of the present disclosure.

FIG. 3 illustrates an example of a process flow 300 in a system that supports user plane relocation for a UE with different session and service continuity modes in accordance with one or more aspects of the present disclosure. Process flow 300 may include a UE 115-*b* and an SMF 215-*a*, which may be examples of the corresponding devices described with reference to FIGS. 1-2. Process flow 300 may also include (R)AN 105-*b*, AMF 240-*a*, UPF 220-*a*, PCF 225-*a*, UDM 210-*a*, and DN 230-*a*, which may be examples of corresponding devices or functions described with reference to FIGS. 1-2.

In the example of FIG. 3, the UE 115-*b* may have already registered on the AMF 240-*a*, thus the AMF 240-*a* may have retrieved the user subscription data from the UDM 210-*a*. At 305, UE 115-*b* may transmit a PDU session establishment request in order to establish a new PDU session. In some cases, as indicated above, the SMF 215-*a* may request that the UE 115-*b* initiate a UPF relocation, and in such cases the UE 115-*b* may transmit the PDU session establishment request using the PDU Session ID of the already existing PDU session for which the user plane is relocated. In some cases, the SMF 215-*a* may provide a PDU session correlation identification to the UE 115-*b*, which the UE 115-*b* may include in the PDU session establishment request.

In some cases, the UE 115-*b* may initiate the UE Requested PDU Session establishment procedure by the transmission of a message containing a PDU Session Establishment Request within the N1 session management (SM) information. The PDU Session Establishment Request may include one or more of a PDU Type, session and service continuity (SSC) mode, or protocol configuration options. If the request is for user plane relocation, the UE 115-*b*, in some examples, may include an indication that the establishment request for user plane relocation, which may be indicated, for example, by setting an associated flag in a user plane relocation field. The message sent by the UE 115-*b* may be encapsulated by the (R)AN 105-*b* in a N2 message that may be provided to AMF 240-*a*.

At 310, the AMF 240-*a* may determine whether the message corresponds to a request for a new PDU Session or a relocation of an existing PDU session and perform SMF selection based at least in part on the determination. In some examples, the AMF 240-*a* may determine that the request is for a new PDU session if a PDU Session ID in the request is not used for any existing PDU Session(s) of the UE 115-*b*, in which case the AMF 240-*a* may selects a SMF in accordance with established SMF selection criteria. If the AMF 240-*a* determines that the request corresponds to a user plane relocation for an existing PDU session, such as based on the PDU Session ID matching an existing PDU Session of the UE, then the AMF 240-*a* may retrieve the current serving SMF for the existing PDU session. In some cases, the request may also include an indication of an establishment cause for establishing the PDU session, and a user plane relocation may be included as one of the establishment causes. If, in such cases, the AMF 240-*a* determines that the establishment cause is user plane relocation, the current serving SMF may be identified for the existing PDU session. In some cases, the AMF 240-*a* may determine that the request message corresponds to a request for user plane relocation for an existing PDU session based on the PDU Session Correlation ID, the AMF 240-*a* may select an SMF based on the PDU Session Correlation ID.

The AMF 240-*a* may transmit a SM request 315, which may include a PDU session establishment request, to SMF 215-*a*. The SM request may include, for example, an identification of the UE 115-*b* (e.g., a Subscriber Permanent ID), N1 SM information, and other parameters. The N1 SM information may include the PDU session establishment request received from the UE 115-*b*.

The SMF 215-*a* may transmit a subscription data request 320 to UDM 210-*a*, which may include, for example, a UE subscriber permanent identification, and other parameters. The UDM 210-*a* may provide a subscription data response 322 to the SMF 215-*a*, which may include, for example, authorized PDU type(s), authorized SSC mode(s), and a default quality of service (QoS) profile. In some cases, SMF 215-*a* may checks whether the UE request is compliant with the user subscription and with local policies.

At 325, PDU session authentication and authorization may be performed. In cases where a PDU session is relocated, the PDU session authentication may determine that the PDU session remains authenticated and authorized. At optional 330, the SMF 215-*a* may perform PCF selection and may exchange PDU-CAN session establishment information 335 with PCF 225-*a*.

At 340, the SMF 215-*a* may perform UPF selection. In some cases, the SMF 215-*a* may determine that the UPF selection is performed as part of a user plane relocation, and may select a new UPF based on the existing PDU session and associated UPFs. The SMF 215-*a* may also allocate an IP address/prefix for the PDU session. The SMF 215-*a* may also initiate a PDU-CAN session establishment or modification 345 towards the PCF 225-*a* to get, for example, policy and charging control (PCC) Rules for the PDU session and update UPF related information in the PCF.

The SMF 215-*a* may initiate an N4 session establishment or modification procedure 350 with the selected UPF 220-*a*, which in cases of a PDU session relocation may be a UPF that is associated with a DN 230-a that may provide data associated with the PDU session. In some cases, core network (CN) tunnel information may be provided to UPF 220-a in N4 session establishment or modification message. The UPF 220-a may provide an N4 session establishment/ modification response 352 to the SMF 215-a. If CN tunnel information is allocated by the UPF 220-a, the CN tunnel information may be provided to SMF 215-a.

The SMF 215-a may provide a SM request acknowledgment 355 to the AMF 240-a, which may include an indication that the PDU session establishment has been accepted. In some cases, the SM request acknowledgment 355 may include information that the AMF 240-a may provide to the (R)AN 105-b, such as CN tunnel information that corresponds to the CN address of the N3 tunnel corresponding to the existing PDU session, a QoS profile, and PDU session ID. The AMF 240-a may transmit N2 PDU session request 360 to (R)AN 105-b.

The (R)AN may exchange AN specific resource setup information 362 with UE 115-b. Such information may include information received from SMF 215-a. In some cases, the exchange may be an RRC connection reconfiguration. The (R)AN 105-b may also allocate (R)AN tunnel information for the PDU Session. Following this exchange, the (R)AN 105-b may provide N2 PDU Session Request Acknowledgment 364 to AMF 240-a. UE 115-b may then transmit first uplink data 365 to the new UPF 220-a, in accordance with the established PDU session with UPF 220-a. In some case, the UE 115-b may also release a prior PDU session with a prior UPF. The AMF 240-a may transmit a SM request with N2 information 370 to SMF 215-a, followed by SMF 215-a transmitting a N4 modification request 375 to UPF 220-a. UPF 220-a may transmit a N4 modification response 377 back to SMF 215-a which may transmit SM request acknowledgment 380 back to AMF 240-a. The SMF 215-a may provide an IP address configuration 385 to UPF 220-a and UE 115-b, and UPF 220-a may transmit first downlink data 390 to the UE 115-b. During the lifetime of the PDU session, the AMF 240-a stores an association of the PDU session ID and the SMF ID.

Figure 4:
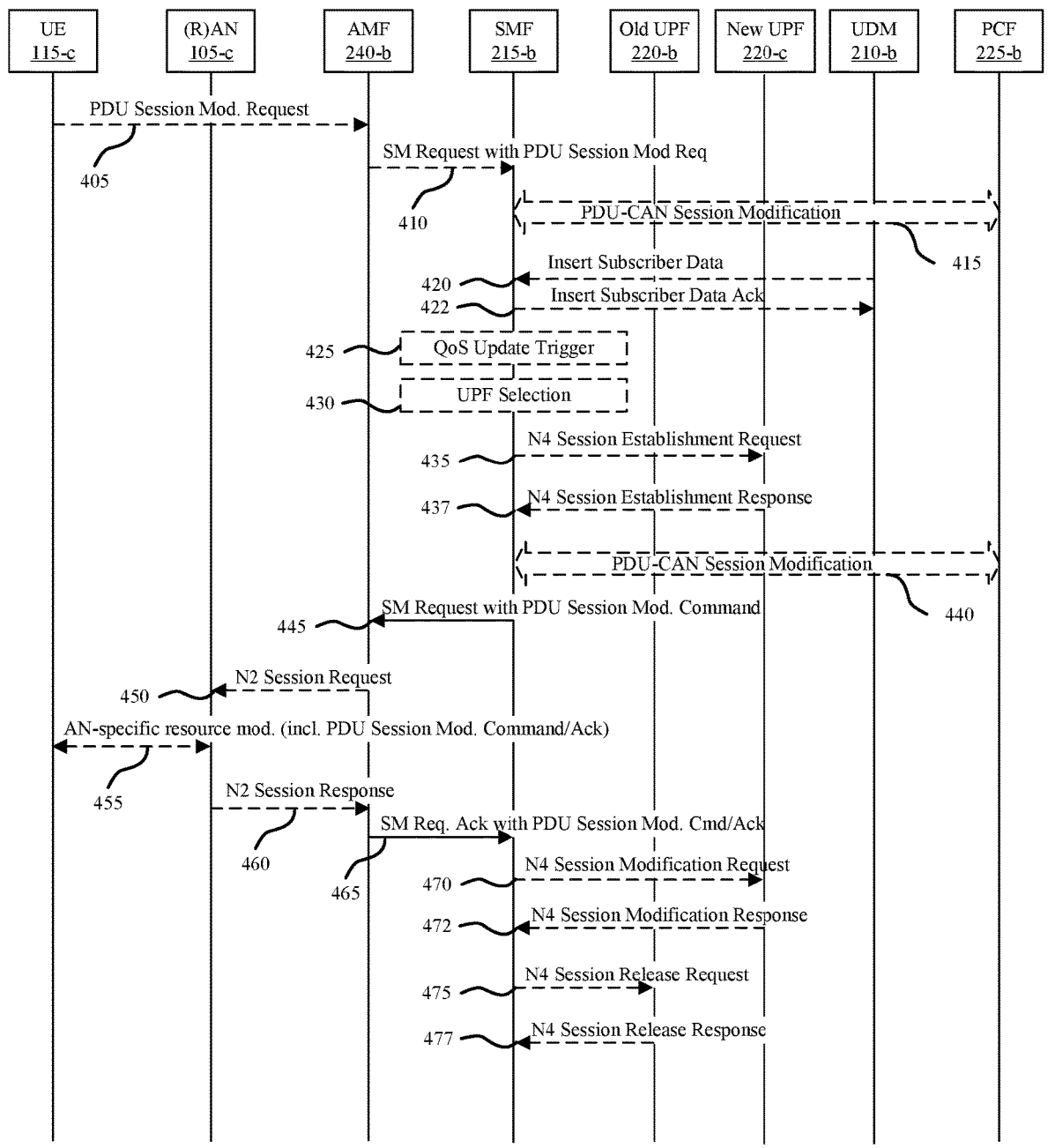

FIG. 4 illustrates an example of a process flow 400 in a system that supports user plane relocation for a UE with different session and service continuity modes in accordance with one or more aspects of the present disclosure. Process flow 400 may include a UE 115-c and an SMF 215-b, which may be examples of the corresponding devices described with reference to FIGS. 1-2. Process flow 400 may also include (R)AN 105-c, AMF 240-b, an old UPF 220-b, a new UPF 220-c, PCF 225-b, and UDM 210-b, which may be examples of corresponding devices or functions described with reference to FIGS. 1-2.

In the example of FIG. 4, the UE 115-c may have already registered on the AMF 240-b, thus the AMF 240-b may have retrieved the user subscription data from the UDM 210-b. At 305, UE 115-c may transmit a PDU session modification request to AMF 240-b in order to modify a PDU session. In some cases, the UE 115-c initiates the procedure to modify the QoS associated with the PDU session. In some cases, as indicated above, the SMF 215-b may request that the UE 115-c initiate a UPF relocation, and in such cases the UE 115-c may transmit the PDU session modification request using the PDU Session ID of the already existing PDU session for which the user plane is relocated In some cases, the UE 115-c may invoke the procedure for SSM mode 2 establishment of a new PDU session, and may provide the PDU Session ID of the existing PDU session, and trigger a UPF relocation.

The AMF 240-b may receive the request and transmit a SM request 410 to SMF 215-b which includes a PDU session modification request. The SMF 215-b may then exchange PDU-CAN session modification information 415 with PCF 225-b. The UDM 210-b may transmit insert subscriber data 420 to the SMF 215-b, and the SMF 215-b may transmit an insert subscriber data acknowledgment 422 back to the UDM 210-b. The insert subscriber data may include, for example, a subscriber permanent identity and subscription data in a message to the SMF 215-b.

At 425, the SMF 215-b may receive a trigger for a QoS update to modify an established PDU session. This procedure may be triggered, for example, based on QoS parameters, or may be triggered based on locally configured policy. If the SMF 215-b receives one of the triggers in 405 through 425, a PDU session modification procedure may be initiated.

At 430, the SMF 215-b may, upon receiving an indication that the procedure is for user plane relocation, determine whether the request is compliant with the user subscription and with local policies. If the request is not compliant, the SMF 215-b may reject the request and the rest of the procedure may be skipped. If the request is compliant, the SMF 215-b may select a new UPF and may allocate an IP address/prefix for the PDU Session. The new UPF may be selected based on a number of factors, such as available UPFs that have access to a DN associated with the PDU session, a proximity of a UPF to the (R)AN 105-c, a QoS of the PDU session, other factors, or any combination thereof.

If the operations at 430 are performed, the SMF 215-b may transmit an N4 session establishment request 435 to the new UPF 220-c that was selected at 430. The SMF 215-b may also provide packet detection, enforcement and reporting rules to be installed on the new UPF 220-c for this PDU Session. If CN tunnel information is allocated by the SMF 215-b, this information may also be provided to the new UPF 220-c. The new UPF 220-c may acknowledge the request by sending an N4 session establishment response 437 to the SMF 215-b. If CN tunnel information is allocated by the new UPF 220-c, the CN tunnel information may be provided to the SMF 215-b.

The SMF 215-b may interact with the PCF 225-b to retrieve one or more policies using PDU CAN session modification communications 440, and in some cases this operation may be skipped if the PDU session modification procedure is triggered by 415 or 425. The SMF 215-b may transmit SM request 445 to AMF 240-b, which may include a PDU session modification command. The SM Request 445 may include, for example, N2 SM information (PDU Session ID), and an N1 SM Container (PDU Session Modification Command (PDU session ID)) in a message to the AMF 240-b. The N2 SM information may include information that the AMF can provide to the (R)AN 105-c, and in case of user plane modification, this may include the CN tunnel information. In some cases, the N1 SM container may provide the PDU session modification command from the AMF 240-b to the UE 115-c.

The AMF 240-b may then send N2 PDU session request 450 to (R)AN 105-c, which may include the N2 SM information received from the SMF 215-b, a NAS message, a message to the (R)AN 105-c, or any combination thereof. The (R)AN 105-c may issue AN specific signaling 455 to exchange information with the UE that is related to the information received from SMF 215-b. For example, in the case of a 3GPP RAN, an RRC Connection reconfiguration may take place with the UE 115-c modifying the necessary RAN resources related to the PDU Session. The UE may acknowledge the PDU session modification command by sending a PDU session modification command acknowledgment message (e.g., via NAS SM signaling).

The (R)AN 105-c may provide an N2 session response 460 to the AMF 240-b, which may provide an N2 PDU session release acknowledgment (NAS message) message to the AMF 240-b. The AMF 240-b may forward the session response to the SMF 215-b via SM request acknowledgment 465. The SMF 215-b may update N4 session of the UPF(s) 220 that are involved by the PDU session modification by sending N4 session modification request 470 to the new UPF 220-c, which may trigger N4 modification response 472 from the new UPF 220-c. In some cases, modification response 472 may trigger an N4 session release request 475 towards the old UPF 220-b and corresponding N4 session release response 477 from the old UPF 220-b.

Figure 5:
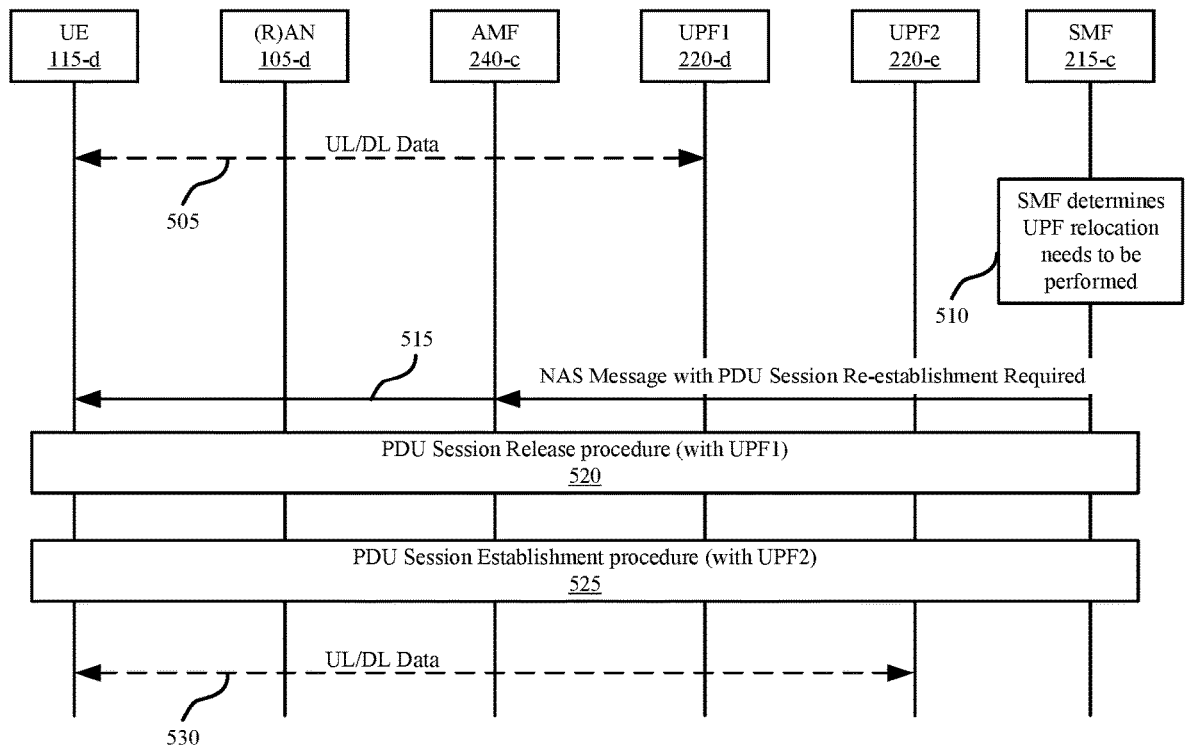

FIG. 5 illustrates an example of a process flow 500 in a system that supports user plane relocation for a UE with different session and service continuity modes in accordance with one or more aspects of the present disclosure. Process flow 500 may include a UE 115-d and an SMF 215-c, which may be examples of the corresponding devices described with reference to FIGS. 1-2. Process flow 500 may also include (R)AN 105-d, AMF 240-c, a first UPF 220-d, and a second UPF 220-e, which may be examples of corresponding devices or functions described with reference to FIGS. 1-3.

In the example of FIG. 5, the UE 115-d may have an existing PDU session established, and may exchange uplink and downlink data 505 with the first UPF 220-d. At 510, the SMF 215-c may determine that the serving first UPF 220-d is to be relocated due to events that may benefit from UPF relocation, such as mobility of the UE 115-d, QoS considerations, other parameters such as discussed above, or combinations thereof. Based on the determination, the SMF 215-c may send a NAS message 515 to the UE 115-d via AMF 240-c. The NAS message 515 may include a PDU session ID to be relocated with an indication that a PDU session re-establishment to the same DN is requested. The SMF 215-c may indicate to the AMF 240-c the need to maintain the PDU session information for this PDU session (e.g., by providing a mapping of PDU Session ID to SMF) for a certain amount of time. Additionally or alternatively, the SMF 215-c may provide the UE 115-d a PDU session correlation identification and may not indicate that the context of the PDU session is to be maintained. The AMF 240-c may, based on the PDU session correlation identification or the indication to maintain PDU session information, maintain the context for the PDU session in order to allow a subsequent PDU session to be established that can use the context.

A PDU session release procedure 520 may be performed to release the session with the first UPF 220-d. The SMF 215-c may, as discussed above, maintain the UE 115-d context (e.g., for an implementation dependent amount of time) after which it may release the UE information if the UE 115-d does not re-establish a new PDU session with the same PDU session ID.

A PDU session establishment procedure 525 may be initiated by the UE 115-d. In some cases, the PDU session release procedure 520 may be performed concurrently with the PDU session establishment procedure 525. In other cases, the PDU session establishment procedure 525 may be performed before the PDU session release procedure 520 (i.e., a new PDU session is made before breaking a previously established PDU session). The establishment of the new PDU session may be performed in a manner similar to that discussed with respect to FIG. 3. In some cases, the PDU session establishment procedure 525 may be performed by providing the same PDU Session ID that the UE 115-d used for the previous PDU session and an indication that the new PDU session is for user plane relocation. Alternatively, the UE 115-d may provide to the AMF 240-c the PDU Session Correlation ID, which the AMF 240-c may use in SMF selection for the PDU session. The correlation ID is such that the AMF 240-c that may have released the context for the PDU session can reselect the same SMF, without the need to disclose to the UE 115-d the SMF address. Then, the AMF 240-c may forward this session establishment request received from the UE 115-d to the SMF 215-c corresponding to the previous PDU session based on the PDU Session ID provided by the UE 115-d, so that the SMF 215-c can select second UPF 220-e (i.e. UPF2) for the re-established PDU session. Following the establishment of the PDU session with the second UPF 220-e, uplink and downlink data 530 may be transmitted using the second UPF 220-e.

Figure 6:
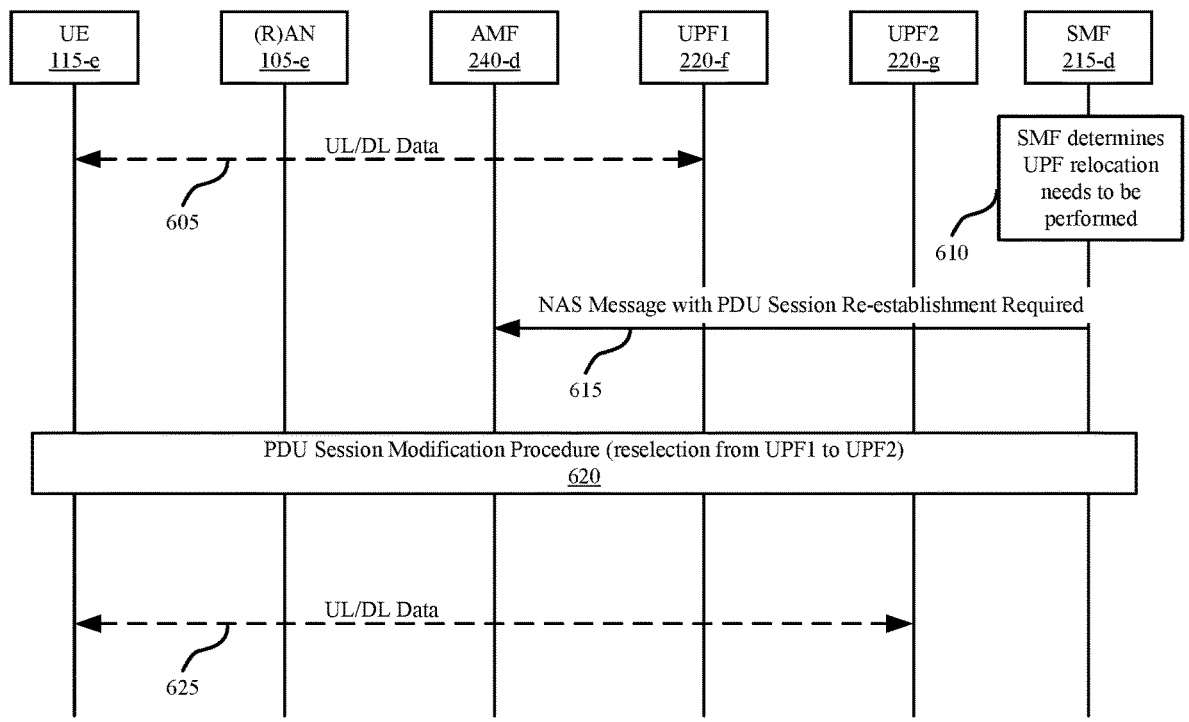

FIG. 6 illustrates an example of a process flow 600 in a system that supports user plane relocation for a UE with different session and service continuity modes in accordance with one or more aspects of the present disclosure. Process flow 600 may include a UE 115-e and an SMF 215-d, which may be examples of the corresponding devices described with reference to FIGS. 1-2. Process flow 600 may also include (R)AN 105-e, AMF 240-d, a first UPF 220-f, and a second UPF 220-g, which may be examples of corresponding devices or functions described with reference to FIGS. 1-2, and 4.

In the example of FIG. 6, the UE 115-e may have an existing PDU session established, and may exchange uplink and downlink data 605 with the first UPF 220-f. At 610, the SMF 215-d may determine that the serving first UPF 220-f is to be relocated due to events that may benefit from UPF relocation, such as mobility of the UE 115-e, QoS considerations, other parameters such as discussed above, or combinations thereof. Based on the determination, the SMF 215-d may send a NAS message 615 to the UE 115-f via AMF 240-d. The NAS message 615 may include a PDU session ID to be relocated with an indication that a PDU session re-establishment to the same DN is requested.

At 620, the SMF 215-d and UE 115-e may perform a PDU session modification procedure to reselect from the first UPF 220-f to the second UPF 220-g. In some cases, the UE 115-e may initiate the PDU session modification procedure of 620 by providing the same PDU Session ID that the UE 115-e used for the previous PDU session and an indication that the PDU session of for user plane relocation. The SMF 215-d may perform PDU session release procedure to release the PDU session at the first UPF 220-f. Thus, a same PDU session from the UE 115-e perspective may be maintained, with a modification from the first UPF 220-f to the second UPF 220-g, and uplink and downlink data 625 may be transmitted using the second UPF 220-g.

Figure 7:
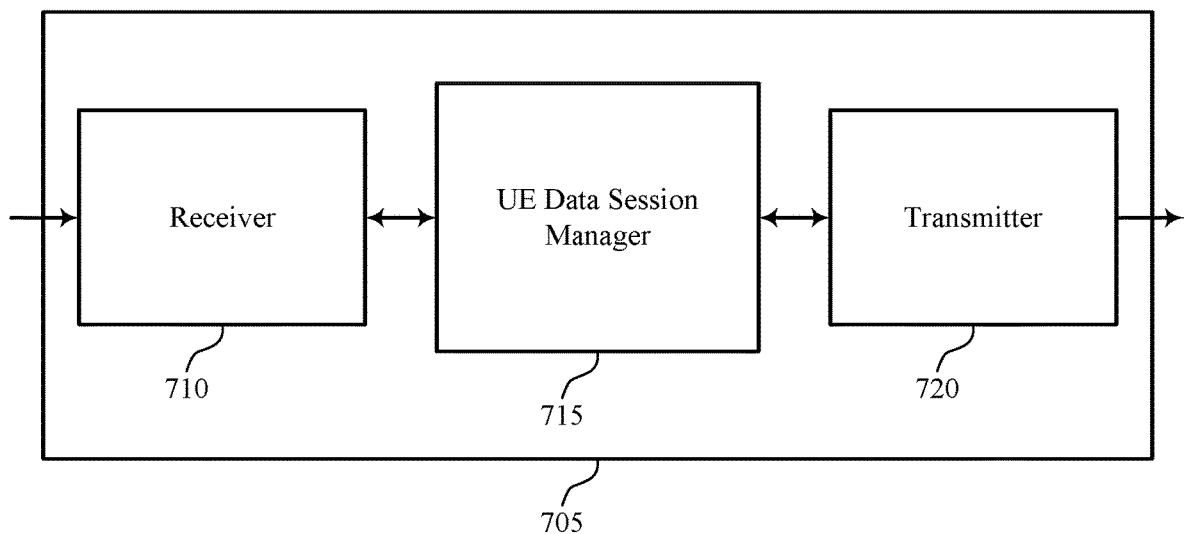
FIGS. 7 through 9 show block diagrams of a device or devices that support user plane relocation for a UE with different session and service continuity modes in accordance with one or more aspects of the present disclosure.

FIG. 7 shows a block diagram 700 of a wireless device 705 that supports user plane relocation for a UE with different session and service continuity modes in accordance with one or more aspects of the present disclosure. Wireless device 705 may be an example of aspects of a UE 115 as described with reference to FIGS. 1-6. Wireless device 705 may include receiver 710, UE data session manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to user plane relocation). Information may be passed on to other components of the device. The receiver 710 may be an example of aspects of the transceiver 1035 described with reference to FIG. 10.

UE data session manager 715 may be an example of aspects of the UE data session manager 1015 described with reference to FIG. 10. UE data session manager 715 and/or at least some of its various sub-components may be implemented in hardware, software executed by a processor, firmware, or any combination thereof. If implemented in software executed by a processor, the functions of the UE data session manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE data session manager 715 and/or at least some of its various sub-components may be physically located at various positions, including being distributed such that portions of functions are implemented at different physical locations by one or more physical devices. In some examples, UE data session manager 715 and/or at least some of its various sub-components may be a separate and distinct component in accordance with various aspects of the present disclosure. In other examples, UE data session manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE data session manager 715 may establish a first data session with a first UPF of a network, receive (e.g., via receiver 710) a request to establish a second data session with the network, and in response to receiving the message, establish a second data session with a second UPF of the network. The UE data session manager 715 also may identify that a user plane of a first data session with a network is to be relocated from a first UPF, initiate a modification of the first data session to be relocated using an identification associated with the first data session, and receive a confirmation of the relocation of the first data session to a second UPF.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may include a single antenna, or it may include a set of antennas. In some cases, transmitter 720 may transmit the NAS transport message to the first core network entity.

Figure 8:
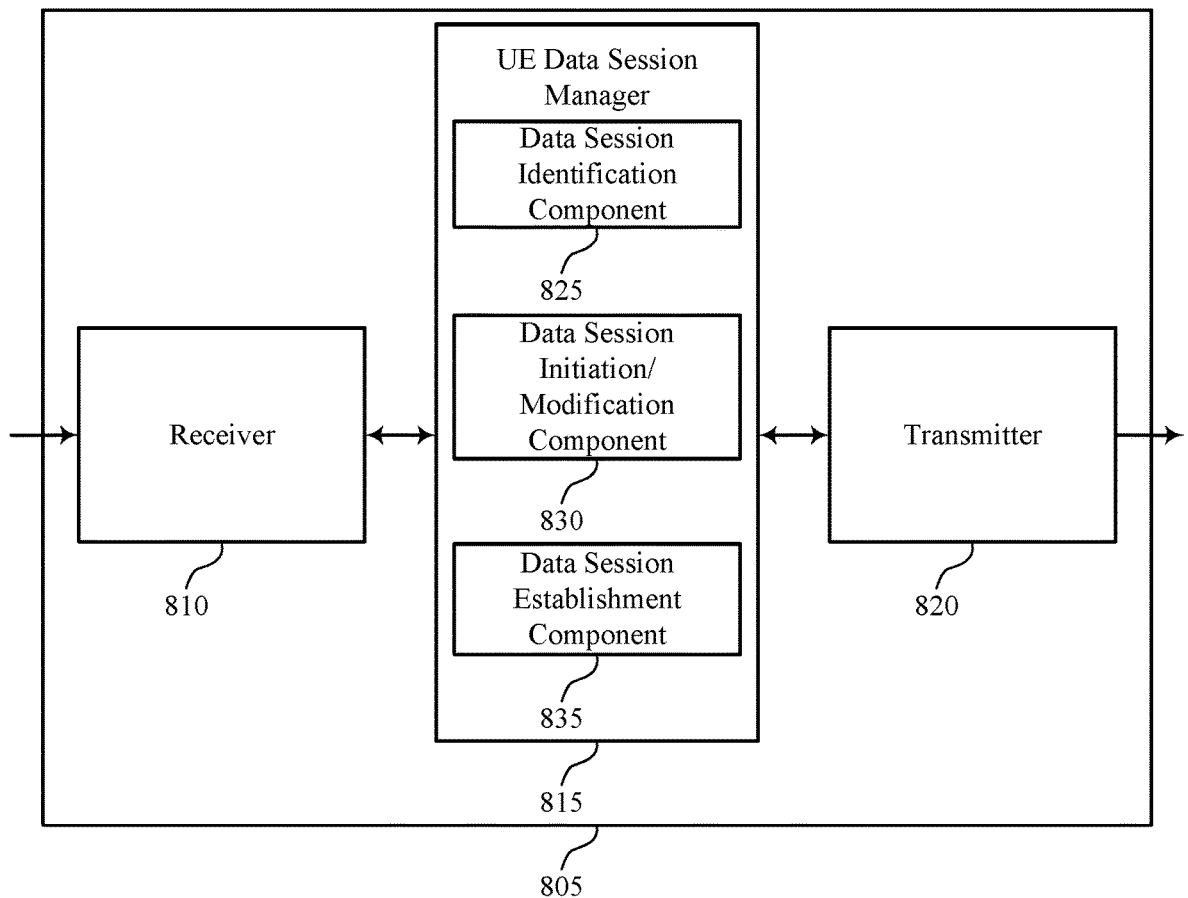

FIG. 8 shows a block diagram 800 of a wireless device 805 that supports user plane relocation for a UE with different session and service continuity modes in accordance with one or more aspects of the present disclosure. Wireless device 805 may be an example of aspects of a wireless device 705 or a UE 115 as described with reference to FIGS. 1-6 and 7. Wireless device 805 may include receiver 810, UE data session manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information or messages related to user plane relocation). Information may be passed on to other components of the device. The receiver 810 may be an example of aspects of the transceiver 1035 described with reference to FIG. 10.

UE data session manager 815 may be an example of aspects of the UE data session manager 1015 described with reference to FIG. 10. UE data session manager 815 may also include data session identification component 825, data session initiation/modification component 830, and data session establishment component 835.

Data session identification component 825 may identify that the user plane of a first data session with the network is to be relocated from the first UPF to the second UPF. Data session identification component 825 may, in some examples, identify that a PDU session at the wireless device and may identify that the PDU session is to be relocated, such as through reception of a request from a SMF to establish a new PDU session. In some cases, the request may include a first data session correlation identification.

Data session initiation/modification component 830 may initiate a second data session. In some cases, data session initiation/modification component 830 may initiate the second data session using an identification associated with the first data session. In some cases, the initiation of the second data session may be performed responsive to the reception of the request from the SMF. In some cases, the second data session may be initiated by transmitting to the network a PDU session establishment request for establishment of the second data session that includes one or more of the first data session identification of the first data session or a first data session correlation identification. In some cases, the PDU session establishment request may include an indication that the PDU session establishment is for a user plane relocation.

Data session initiation/modification component 830 may, in some cases, initiate a modification of the first data session to be relocated using an identification associated with the first data session. Such a modification may be initiated, for example, by transmitting a PDU session modification request for relocation of the first data session, the PDU session modification request including a first data session identification of the first data session. In some cases, the PDU session modification request may include a first data session correlation identification.

Data session establishment component 835 may establish the first data session as a first PDU session with a first UPF and may, responsive to the initiation of the second data session and/or responsive to the reception of the request from the SMF, establish the second data session with a second UPF. In some cases, data session establishment component 835 may release, after the establishing the second data session, the first data session with the first UPF. In some cases, a confirmation may be received from the network that the second data session is established, and user plane information associated with the second data session may be received from the second UPF. In cases where the first data session is modified to be relocated from the first UPF to the second UPF, a confirmation of the relocation of the first data session to a second UPF may be received.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may include a single antenna, or it may include a set of antennas.

Figure 9:
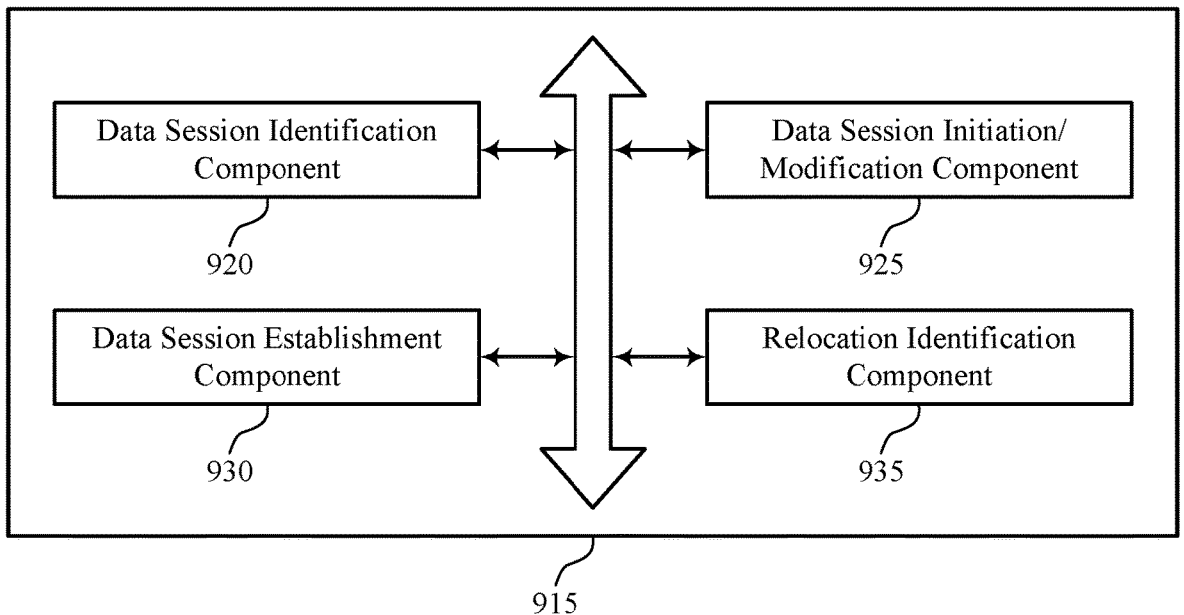

FIG. 9 shows a block diagram 900 of a UE data session manager 915 that supports user plane relocation for a UE with different session and service continuity modes in accordance with one or more aspects of the present disclosure. The UE data session manager 915 may be an example of aspects of a UE data session manager 715, a UE data session manager 815, or a UE data session manager 1015 described with reference to FIGS. 7, 8, and 10. The UE data session manager 915 may include data session identification component 920, data session initiation/modification component 925, data session establishment component 930, and relocation identification component 935. Each of these modules may communicate, directly or indirectly, with one another (e.g., via one or more buses).

Data session identification component 920 may identify that the user plane of the first data session with the network is to be relocated from the first UPF to the second UPF. Data session identification component 920 may, in some examples, identify that a PDU session at the wireless device and may identify that the PDU session is to be relocated, such as through reception of a request from a SMF to establish a new PDU session. In some cases, the request may include a first data session correlation identification.

Data session initiation/modification component 925 may initiate a second data session. In some cases, data session initiation/modification component 925 may initiate the second data session using an identification associated with the first data session. In some cases, the initiation of the second data session may be performed responsive to the reception of the request from the SMF. In some cases, the second data session may be initiated by transmitting to the network a PDU session establishment request for establishment of the second data session that includes one or more of the first data session identification of the first data session or a first data session correlation identification. In some cases, the PDU session establishment request may include an indication that the PDU session establishment is for a user plane relocation.

Data session initiation/modification component 925 may, in some cases, initiate a modification of the first data session to be relocated using an identification associated with the first data session. Such a modification may be initiated, for example, by transmitting a PDU session modification request for relocation of the first data session, the PDU session modification request including a first data session identification of the first data session. In some cases, the PDU session modification request may include a first data session correlation identification.

Data session establishment component 930 may establish the first data session as a first PDU session with a first UPF and may, responsive to the initiation of the second data session and/or responsive to the reception of the request from the SMF, establish the second data session with a second UPF. In some cases, data session establishment component 930 may release the first data session with the first UPF after establishing the second data session. In some cases, a confirmation may be received from the network that the second data session is established, and user plane information associated with the second data session may be received from the second UPF. In cases where the first data session is modified to be relocated from the first UPF to the second UPF, a confirmation of the relocation of the first data session to a second UPF may be received.

Relocation identification component 935 may receive a request from a SMF to relocate the first data session. In some cases, the request from the SMF may be a request to establish a second data session and the relocation identification component 935 may transmit a PDU session establishment request that includes the first data session identification. In some cases, the request may include an indication that the PDU session modification request is for a user plane relocation. In cases where the first data session is to be modified, the PDU session modification request may transmitted. In some cases, a SMF may request that the PDU session be relocated, and the relocation identification component 935 may transmit the session establishment request or session modification request that includes one or more of a session ID of the first PDU session, a cause indication of user plane relocation, or a PDU session correlation ID.

Figure 10:
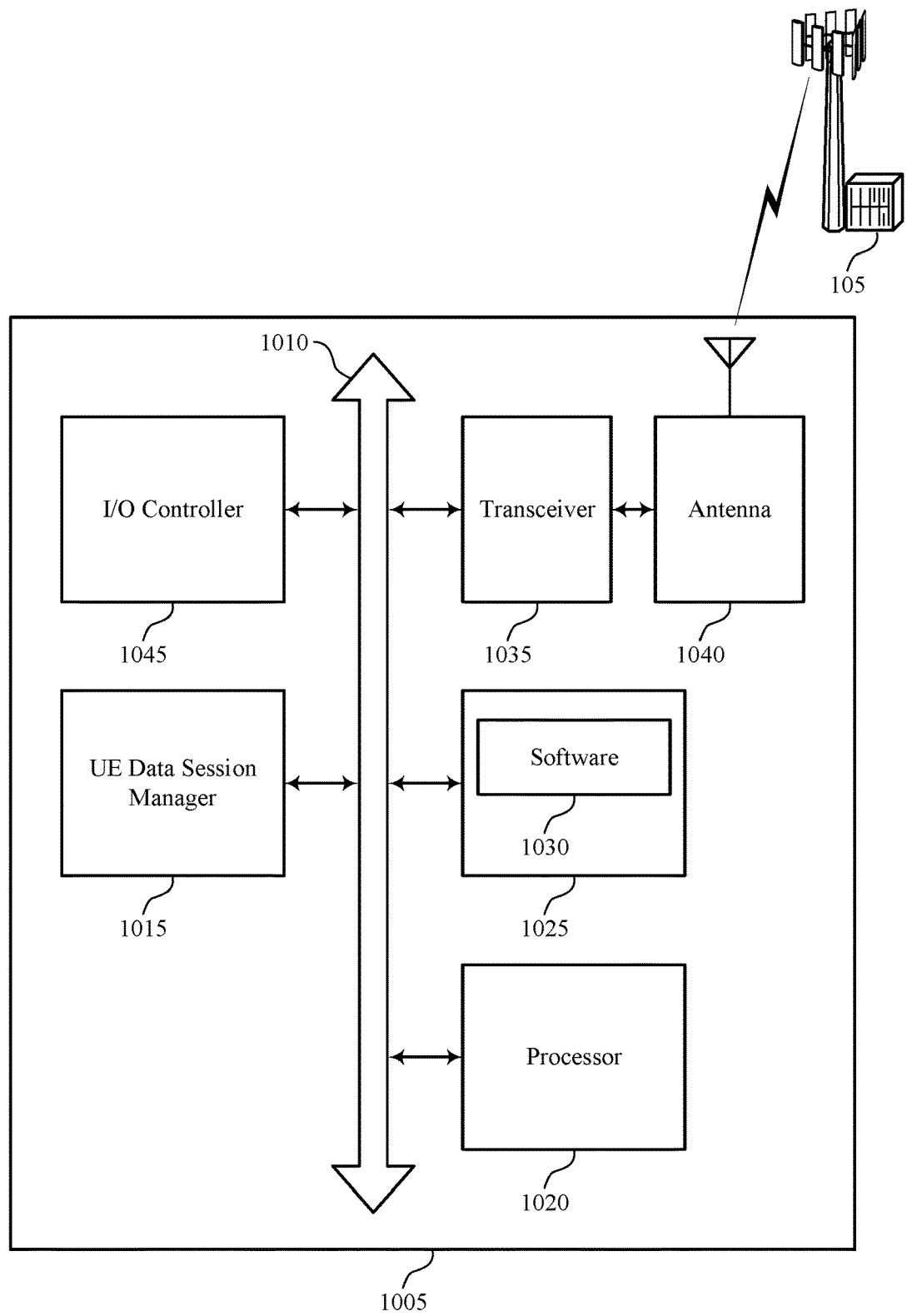
FIG. 10 illustrates a block diagram of a system including a UE that supports user plane relocation for a UE with different session and service continuity modes in accordance with one or more aspects of the present disclosure.

FIG. 10 shows a diagram of a system 1000 including a device 1005 that supports user plane relocation for a UE with different session and service continuity modes in accordance with one or more aspects of the present disclosure. Device 1005 may be an example of or include the components of wireless device 705, wireless device 805, or a UE 115 as described above, e.g., with reference to FIGS. 1-6, 7 and 8. Device 1005 may include components for bi-directional voice and data communications including components for transmitting and receiving communications, including UE data session manager 1015, processor 1020, memory 1025, software 1030, transceiver 1035, antenna 1040, and I/O controller 1045. These components may be in electronic communication via one or more busses (e.g., bus 1010). Device 1005 may communicate wirelessly with one or more base stations 105.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting user plane relocation for a UE with different session and service continuity modes).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware and/or software operation such as the interaction with peripheral components or devices.

Software 1030 may include code to implement aspects of the present disclosure, including code to support NAS transport for non-mobility management messages. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
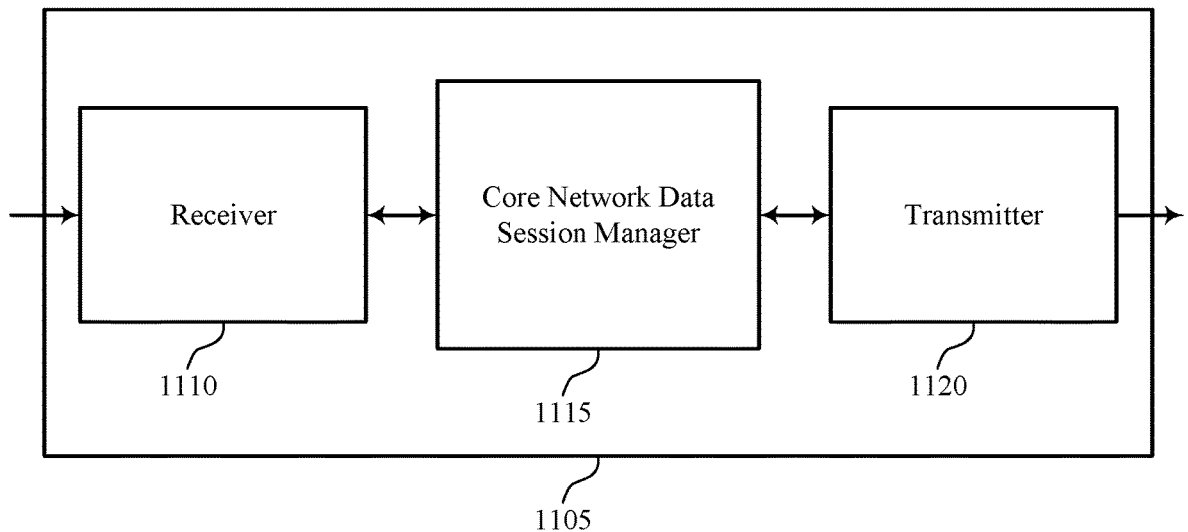
FIGS. 11 through 13 show block diagrams of a device or devices that support user plane relocation for a UE with different session and service continuity modes in accordance with one or more aspects of the present disclosure.

FIG. 11 shows a block diagram 1100 of a wireless device 1105 that supports user plane relocation for a UE with different session and service continuity modes in accordance with one or more aspects of the present disclosure. Wireless device 1105 may be an example of aspects of core network 130 as described with reference to FIGS. 1-6. For example, wireless device 1105 may be an example of aspects of an SMF 120 at a core network described with reference to FIG. 1 or SMF 215 described with reference to FIGS. 2-6. Wireless device 1105 may include receiver 1110, core network data session manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to user plane relocation). Information may be passed on to other components of the device. The receiver 1110 may be an example of aspects of the transceiver 1435 described with reference to FIG. 14.

Core network data session manager 1115 may be an example of aspects of the core network data session manager 1415 described with reference to FIG. 14. Core network data session manager 1115 and/or at least some of its various sub-components may be implemented in hardware, software executed by a processor, firmware, or any combination thereof. If implemented in software executed by a processor, the functions of the core network data session manager 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The core network data session manager 1115 and/or at least some of its various sub-components may be physically located at various positions, including being distributed such that portions of functions are implemented at different physical locations by one or more physical devices. In some examples, core network data session manager 1115 and/or at least some of its various sub-components may be a separate and distinct component in accordance with various aspects of the present disclosure. In other examples, core network data session manager 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Core network data session manager 1115 may determine that a user plane of a first data session of a UE is to be relocated away from a first UPF, and perform a user plane relocation of the first data session via establishing a second data session at a second UPF. Core network data session manager 1115 also may determine that a user plane of a first data session of a UE is to be relocated away from a first UPF, and perform a user plane relocation of the first data session via modifying the first data session to be served by a second UPF.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may include a wired or wireless connection that may include a single antenna, or it may include a set of antennas.

Figure 12:
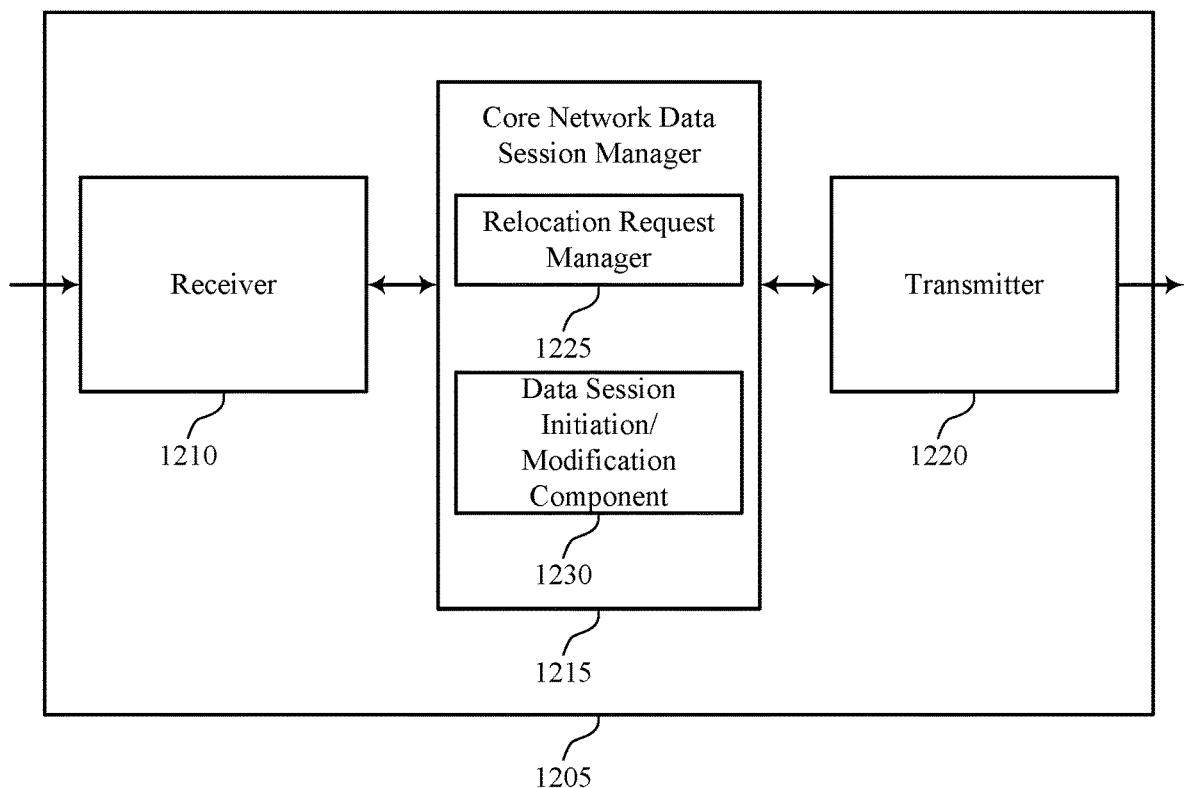

FIG. 12 shows a block diagram 1200 of a wireless device 1205 that supports user plane relocation for a UE with different session and service continuity modes in accordance with one or more aspects of the present disclosure. Wireless device 1205 may be an example of aspects of a wireless device 1105 or an entity of a core network 130 as described with reference to FIGS. 1-6 and 11. For example, wireless device 1205 may be an example of aspects of an SMF described with reference to FIGS. 1-6 and 11. Wireless device 1205 may include receiver 1210, core network data session manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to user plane relocation). Information may be passed on to other components of the device. The receiver 1210 may be an example of aspects of the transceiver 1435 described with reference to FIG. 14.

Core network data session manager 1215 may be an example of aspects of the core network data session manager 1415 described with reference to FIG. 14. Core network data session manager 1215 may also include relocation request manager 1225, and data session initiation/modification component 1230.

Relocation request manager 1225 may determine that a user plane of a first data session of a UE is to be relocated away from a first UPF. In some cases, the relocation request manager 1320 may receive a request from a UE to establish a second data session, the request including a first data session identification, and may determine that the request requires a UPF relocation away from a first UPF serving the first data session based at least in part on the first data session identification provided by the UE.

In some cases, relocation request manager 1225 may receive a request from a UE to modify a first data session, the request including a first data session identification, and determine that the request requires a UPF relocation away from the first UPF serving the first data session based at least in part on the first data session identification provided by the UE. In some cases, relocation request manager 1225 may receive, in the request from the UE, a cause indication that the second data session establishment is for a user plane relocation.

Data session initiation/modification component 1230 may perform a user plane relocation of the first data session via establishing a second data session at a second UPF. Data session initiation/modification component 1230 also may perform a user plane relocation of the first data session via modifying the first data session to be served by a second UPF. In some cases, a request may be sent to the UE to establish a second data session. In some cases, data session initiation/modification component 1230 also may trigger a session release at the first UPF.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may include a single antenna, or it may include a set of antennas.

Figure 13:
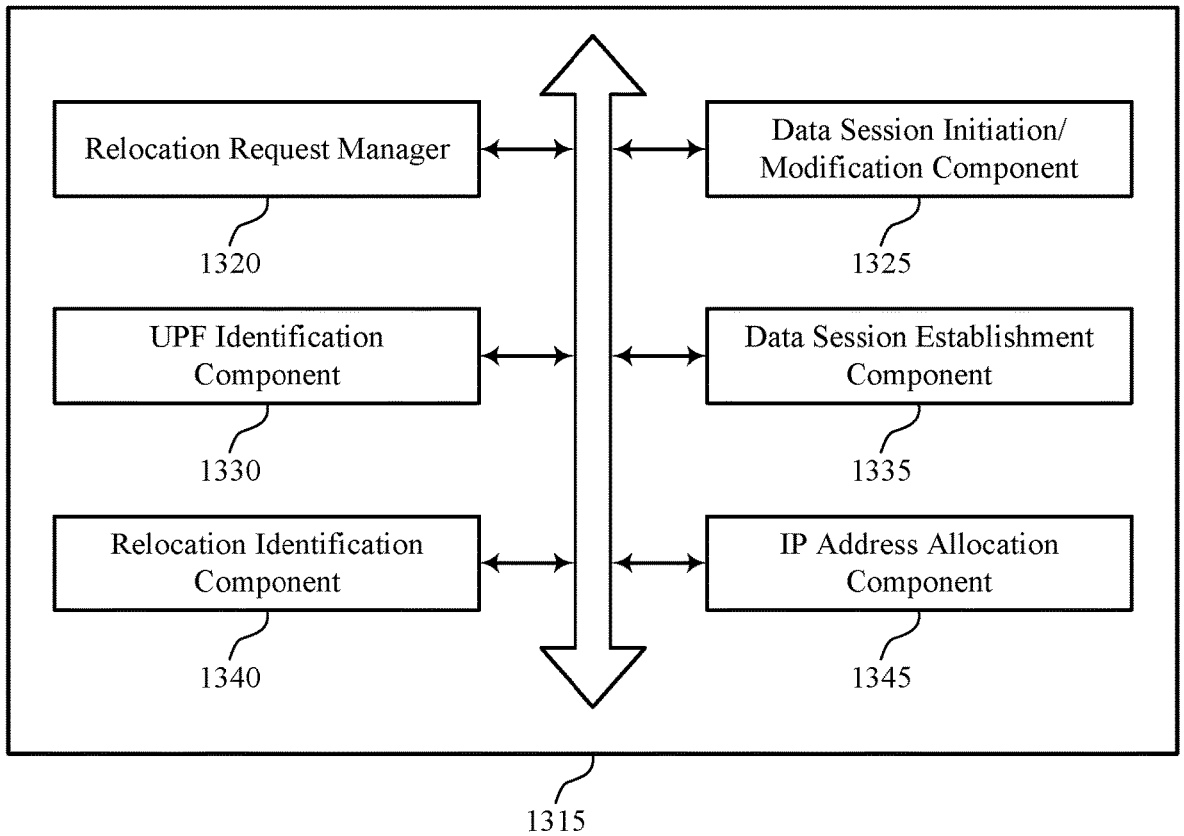

FIG. 13 shows a block diagram 1300 of a core network entity data session manager 1315 that supports user plane relocation for a UE with different session and service continuity modes in accordance with one or more aspects of the present disclosure. The core network entity data session manager 1315 may be an example of aspects of a core network data session manager 1415 described with reference to FIGS. 11, 12, and 14. The core network entity data session manager 1315 may include relocation request manager 1320, data session initiation/modification component 1325, UPF identification component 1330, Data session establishment component 1335, relocation identification component 1340, and IP address allocation component 1345. Each of these modules may communicate, directly or indirectly, with one another (e.g., via one or more buses).

Relocation request manager 1320 may determine that a user plane of a first data session of a UE is to be relocated away from a first UPF. In some cases, the relocation request manager 1320 may receive a request from a UE to establish a second data session, the request including a first data session identification, and may determine that the request requires a UPF relocation away from a first UPF serving the first data session based at least in part on the first data session identification provided by the UE.

In some cases, relocation request manager 1320 may receive a request from a UE to modify a first data session, the request including a first data session identification, and determine that the request requires a UPF relocation away from the first UPF serving the first data session based at least in part on the first data session identification provided by the UE. In some cases, relocation request manager 1320 may receive, in the request from the UE, a cause indication that the second data session establishment is for a user plane relocation.

Data session initiation/modification component 1325 may perform a user plane relocation of the first data session via establishing a second data session at a second UPF. Data session initiation/modification component 1325 also may perform a user plane relocation of the first data session via modifying the first data session to be served by a second UPF. In some cases, a request may be sent to the UE to establish a second data session. In some cases, data session initiation/modification component 1325 also may trigger a session release at the first UPF.

UPF identification component 1330 may select the second UPF for the second data session or the modified first data session, and transmit, to the UE, user plane information associated with the second UPF. Data session establishment component 1335 may establish the second data session with the second UPF.

Relocation identification component 1340 may identify a first data session correlation identification in the request to establish a second data session. In some cases, the relocation identification component 1340 may transmit, to the UE, user plane information associated with the second data session and the second UPF. IP address allocation component 1345 may allocate IP addresses for the UE.

Figure 14:
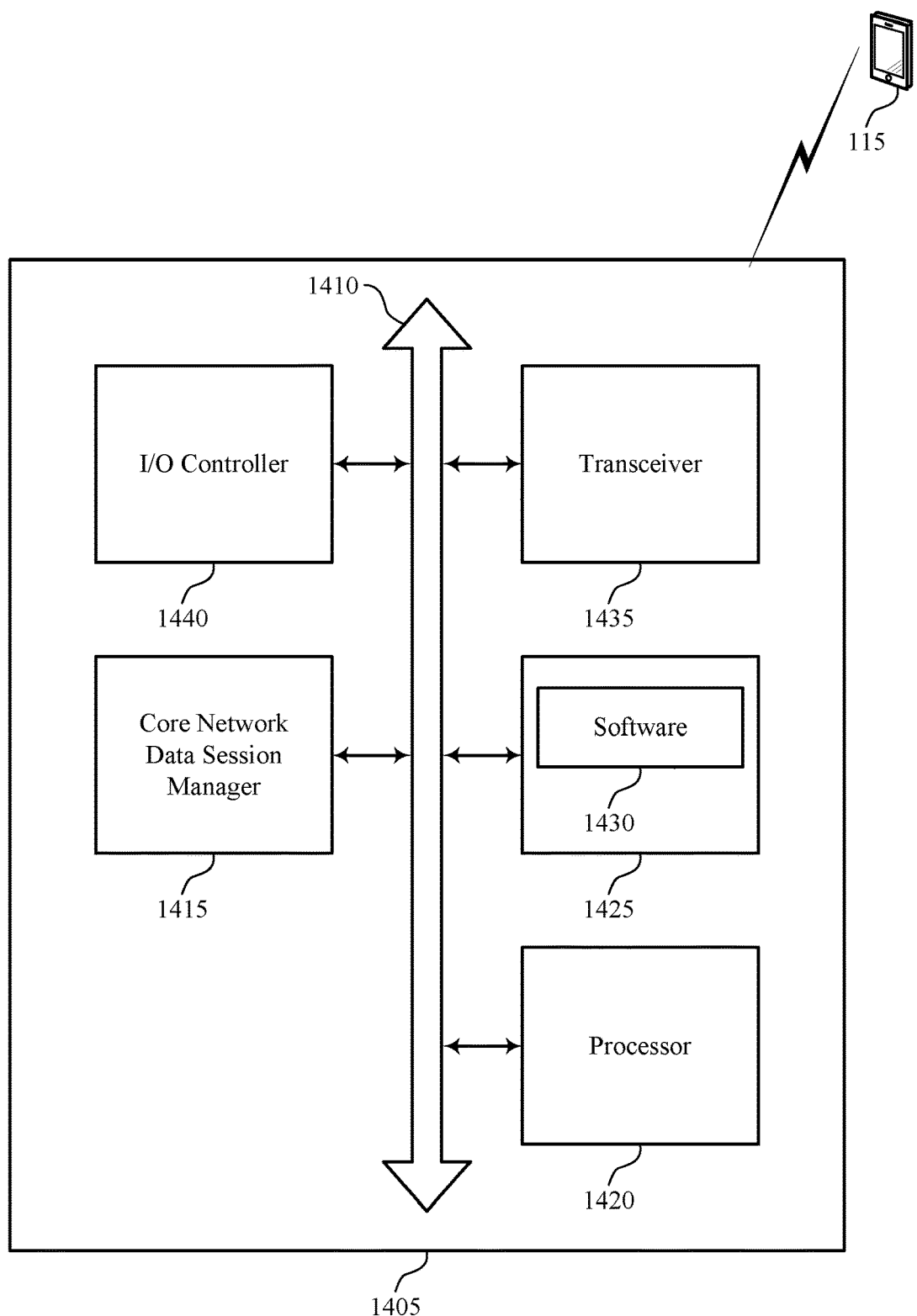
FIG. 14 illustrates a block diagram of a system including a core network entity that supports user plane relocation for a UE with different session and service continuity modes in accordance with one or more aspects of the present disclosure.

FIG. 14 shows a diagram of a system 1400 including a device 1405 that supports user plane relocation for a UE with different session and service continuity modes in accordance with one or more aspects of the present disclosure. Device 1405 may be an example of or include the components of core network entity (e.g., SMF 120) as described above, e.g., with reference to FIG. 1. Device 1405 may include components for bi-directional voice and data communications including components for transmitting and receiving communications, including core network entity data session manager 1415, processor 1420, memory 1425, software 1430, transceiver 1435, and I/O controller 1440. These components may be in electronic communication via one or more busses (e.g., bus 1410).

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting user plane relocation for a UE with different session and service continuity modes).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware and/or software operation such as the interaction with peripheral components or devices.

Software 1430 may include code to implement aspects of the present disclosure, including code to support NAS transport for non-mobility management messages. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

I/O controller 1440 may manage input and output signals for device 1405. I/O controller 1440 may also manage peripherals not integrated into device 1405. In some cases, I/O controller 1440 may represent a physical connection or port to an external peripheral. In some cases, I/O controller 1440 may utilize an operating system such as iOS®, ANDROID®, MS-DOS®, MS-WINDOWS®, OS/2®, UNIX®, LINUX®, or another known operating system. In other cases, I/O controller 1440 may represent or interact with a modem, a keyboard, a mouse, a touchscreen, or a similar device. In some cases, I/O controller 1440 may be implemented as part of a processor. In some cases, a user may interact with device 1405 via I/O controller 1440 or via hardware components controlled by I/O controller 1440.

Figure 15:
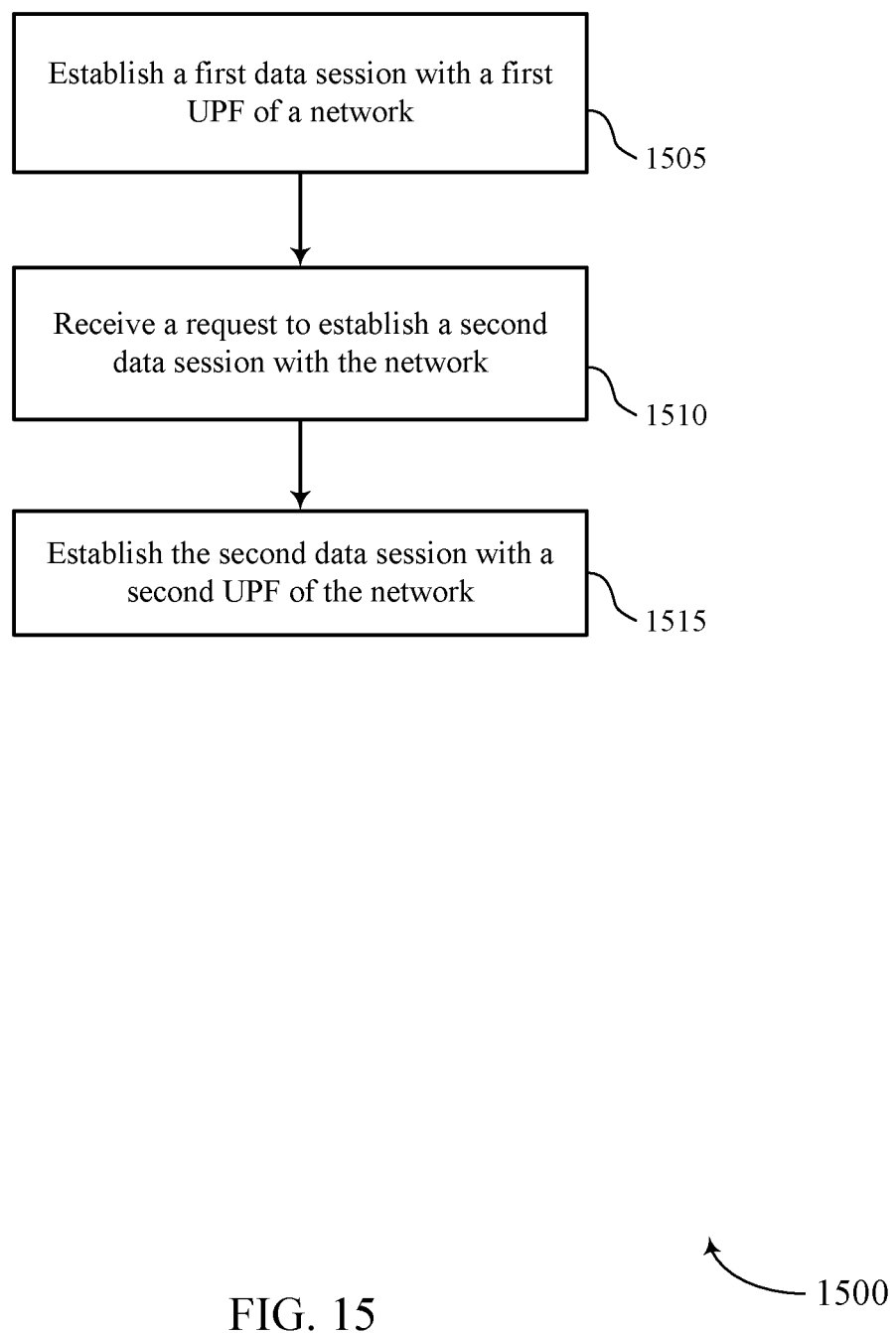
FIGS. 15 through 18 illustrate methods for user plane relocation for a UE with different session and service continuity modes in accordance with one or more aspects of the present disclosure.

FIG. 15 shows a flowchart illustrating a method 1500 for user plane relocation for a UE with different session and service continuity modes in accordance with one or more aspects of the present disclosure. The operations of method 1500 may be implemented by a UE 115 or its components as described herein. For example, the operations of method 1500 may be performed by a UE data session manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At 1505, the UE 115 may establish a first data session with a first UPF of a network. The operations of 1505 may be performed according to the methods described with reference to FIGS. 1 through 6. In certain examples, aspects of the operations of 1505 may be performed by a data session initiation/modification component and/or data session establishment component as described with reference to FIGS. 7 through 10.

At 1510, the UE 115 may receive a request to establish a second data session with the network. The operations of 1510 may be performed according to the methods described with reference to FIGS. 1 through 6. In certain examples, aspects of the operations of 1510 may be performed by a receiver and/or a data session identification component as described with reference to FIGS. 7 through 10.

At 1515, the UE 115 may establish the second data session with a second UPF. The operations of 1515 may be performed according to the methods described with reference to FIGS. 1 through 6. In certain examples, aspects of the operations of 1515 may be performed by a data session establishment component as described with reference to FIGS. 7 through 10.

Figure 16:
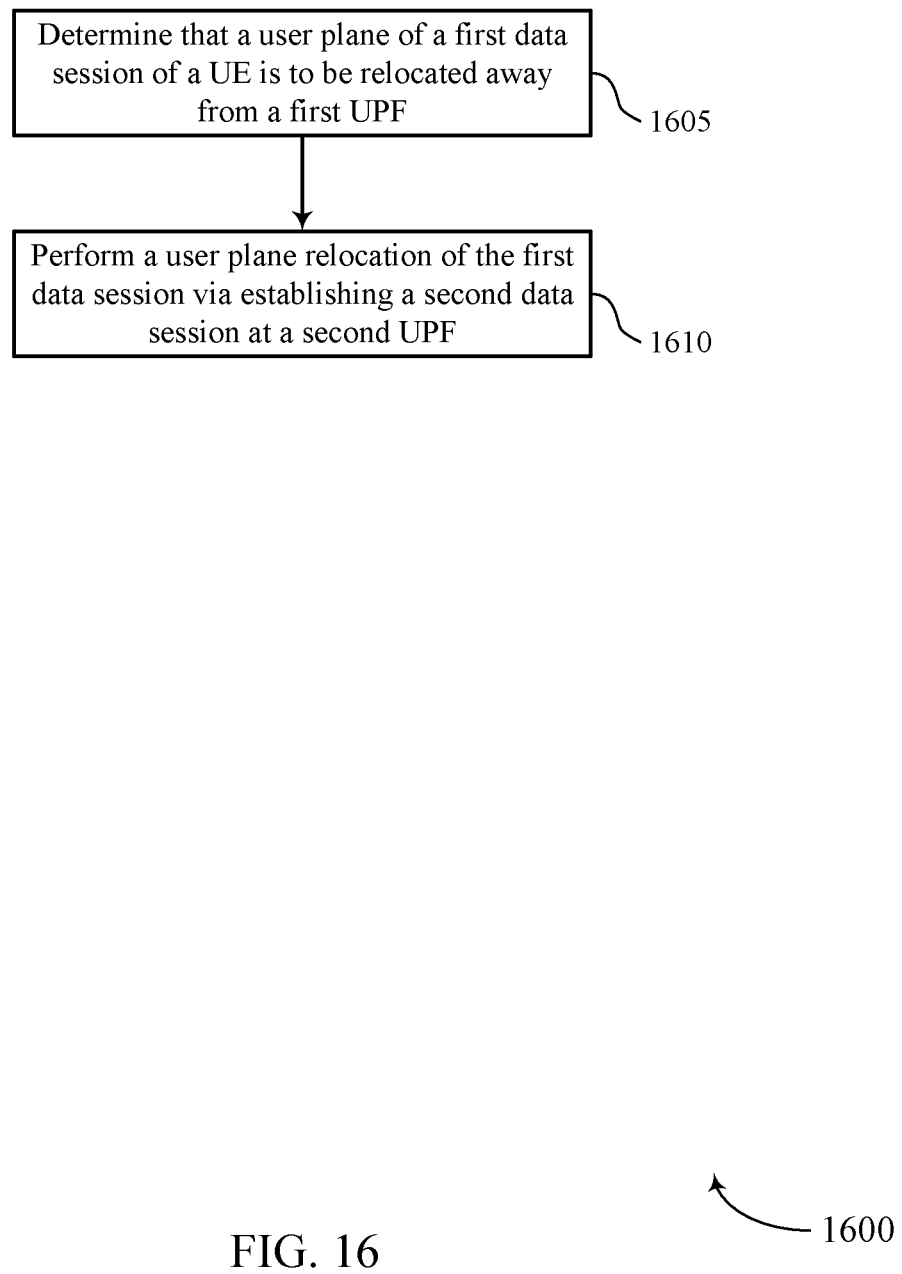

FIG. 16 shows a flowchart illustrating a method 1600 for user plane relocation for a UE with different session and service continuity modes in accordance with one or more aspects of the present disclosure. The operations of method 1600 may be implemented by a core network entity (e.g., SMF) or its components as described herein. For example, the operations of method 1600 may be performed by a core network data session manager as described with reference to FIGS. 11 through 14. In some examples, a core network entity may execute a set of codes to control the functional elements of the device to perform the functions described below. Additionally or alternatively, the core network entity may perform aspects of the functions described below using special-purpose hardware.

At 1605, the core network entity may determine that a user plane of a first data session of a UE is to be relocated away from a first UPF. The operations of 1605 may be performed according to the methods described with reference to FIGS. 1 through 6. In certain examples, aspects of the operations of 1605 may be performed by a relocation request manager as described with reference to FIGS. 11 through 14.

At 1610, the core network entity may perform a user plane relocation of the first data session via establishing a second data session at a second UPF. The operations of 1610 may be performed according to the methods described with reference to FIGS. 1 through 6. In certain examples, aspects of the operations of 1610 may be performed by a data session initiation/modification component as described with reference to FIGS. 11 through 14.

Figure 17:
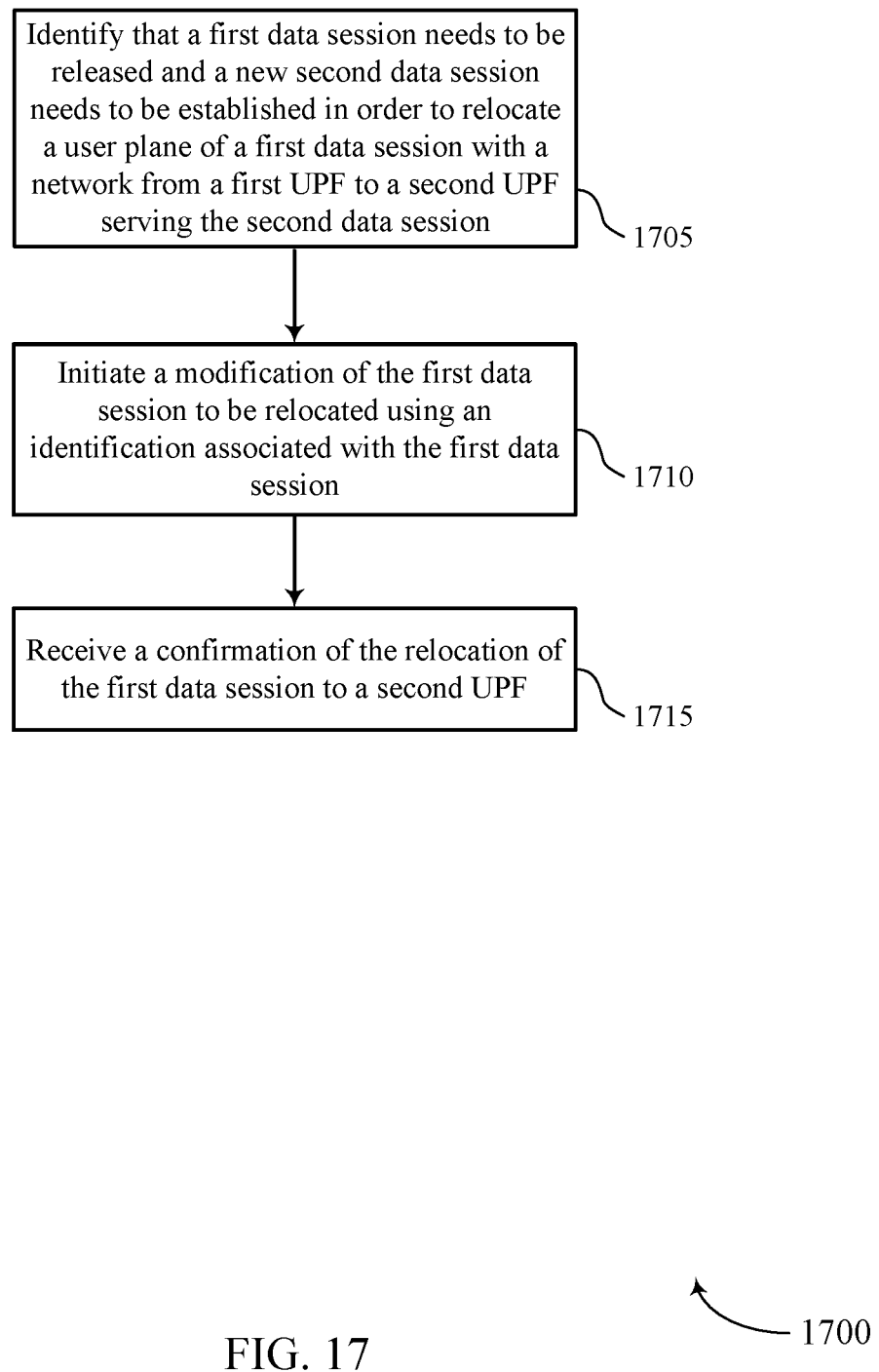

FIG. 17 shows a flowchart illustrating a method 1700 for user plane relocation for a UE with different session and service continuity modes in accordance with one or more aspects of the present disclosure. The operations of method 1700 may be implemented by a UE 115 or its components as described herein. For example, the operations of method 1700 may be performed by a UE data session manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At 1705, the UE 115 may identify that a first data session needs to be released and a new second data session needs to be established in order to relocate a user plane of a first data session with a network from a first UPF to a second UPF serving the second data session. The operations of 1705 may be performed according to the methods described with reference to FIGS. 1 through 6. In certain examples, aspects of the operations of 1705 may be performed by a data session identification component as described with reference to FIGS. 7 through 10.

At 1710, the UE 115 may initiate a modification of the first data session to be relocated using an identification associated with the first data session. The operations of 1710 may be performed according to the methods described with reference to FIGS. 1 through 6. In certain examples, aspects of the operations of 1710 may be performed by a data session initiation/modification component as described with reference to FIGS. 7 through 10.

At 1715, the UE 115 may receive a confirmation of the relocation of the first data session to a second UPF. The operations of 1715 may be performed according to the methods described with reference to FIGS. 1 through 6. In certain examples, aspects of the operations of 1715 may be performed by a data session establishment component as described with reference to FIGS. 7 through 10.

Figure 18:
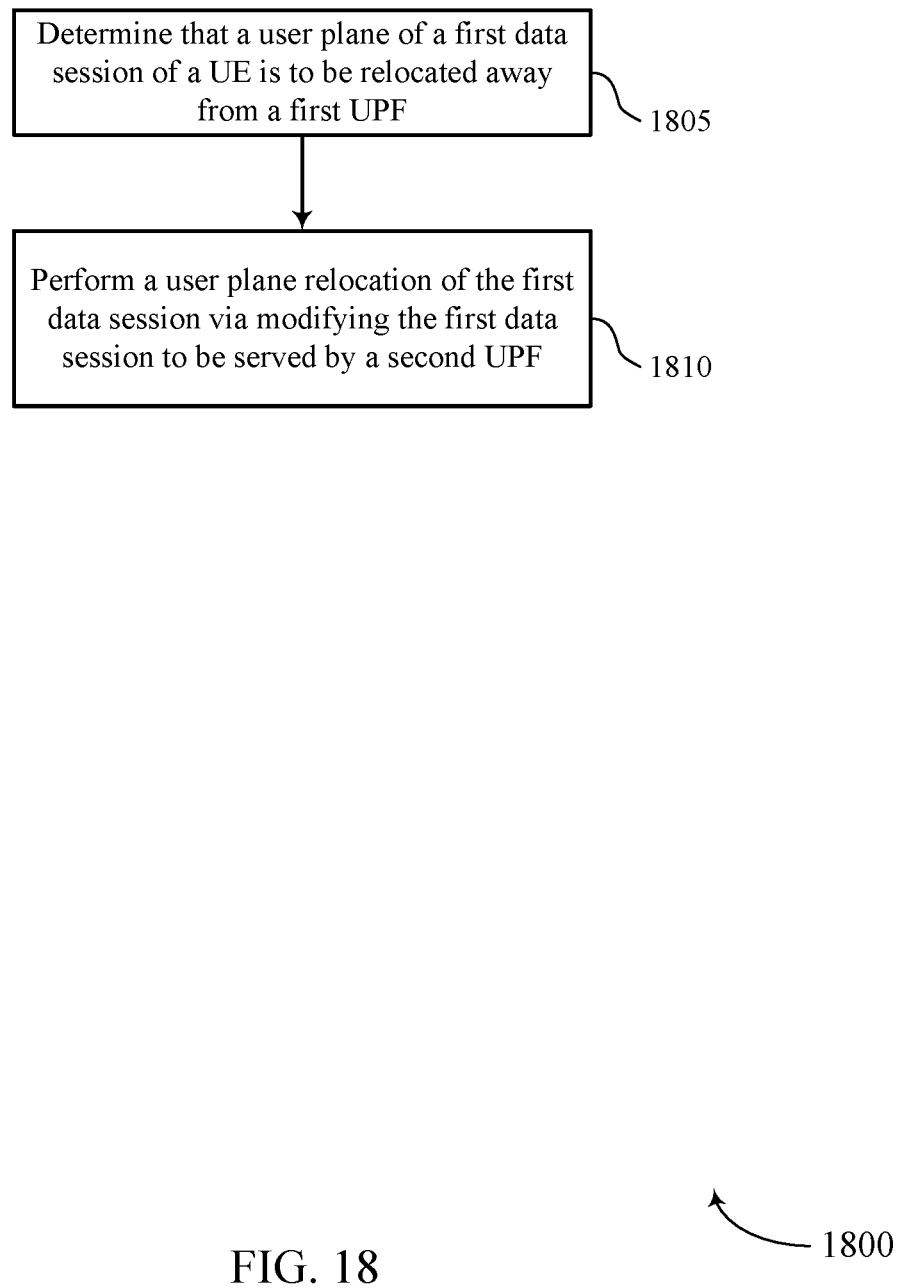

FIG. 18 shows a flowchart illustrating a method 1800 for user plane relocation for a flowchart illustrating a method 1800 for user plane relocation for a UE with different session and service continuity modes in accordance with one or more aspects of the present disclosure. The operations of method 1800 may be implemented by a core network entity (e.g., SMF) or its components as described herein. For example, the operations of method 1800 may be performed by a core network data session manager as described with reference to FIGS. 11 through 14. In some examples, a core network entity may execute a set of codes to control the functional elements of the device to perform the functions described below. Additionally or alternatively, the core network entity may perform aspects of the functions described below using special-purpose hardware.

At 1805, the core network entity may determine that a user plane of a first data session of a UE is to be relocated away from a first UPF. The operations of 1805 may be performed according to the methods described with reference to FIGS. 1 through 6. In certain examples, aspects of the operations of 1805 may be performed by a relocation request manager as described with reference to FIGS. 11 through 14.

At 1810, the core network entity may perform a user plane relocation of the first data session via modifying the first data session to be served by a second UPF. The operations of 1810 may be performed according to the methods described with reference to FIGS. 1 through 6. In certain examples, aspects of the operations of 1810 may be performed by a data session initiation/modification component as described with reference to FIGS. 11 through 14.

It should be noted that the methods described above describe possible implementations, and that the operations may be rearranged or otherwise modified and that other implementations are possible. Further, aspects from two or more of the methods may be combined.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector) of a carrier or base station, depending on context.

Base stations may include or may be referred to by those skilled in the art as a base transceiver station, a radio base station, an access point, a radio transceiver, a NodeB, eNB, next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and wireless communications system architecture 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary operation that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   establishing, by a user equipment (UE), a first data session with a first user plane function (UPF) of a network;
   receiving, at the UE via an Access and Mobility Management Function (AMF) of the network, a network access stratum (NAS) message comprising a request to establish a second data session with the network, the NAS message sent by a Session Management Function (SMF) of the network based on a determination that a user plane function (UPF) relocation is to be performed; and
   establishing, by the UE and in response to receiving the NAS message that comprises the request to establish the second data session with the network and which was sent by the SMF of the network based on the determination that the UPF relocation is to be performed, the second data session with a second UPF of the network.

2. The method of claim 1, further comprising:
   releasing, after establishing the second data session, the first data session with the first UPF.

3. The method of claim 1, wherein establishing the second data session comprises:
   transmitting to the network a protocol data unit (PDU) session establishment request for establishment of the second data session that includes a data session identification associated with the first data session.

4. The method of claim 3, wherein establishing the second data session with the second UPF further comprises:
   transmitting an indication that the PDU session establishment request is for a user plane relocation.

5. The method of claim 4, further comprising:
   receiving a confirmation from the network that the second data session is established; and
   receiving user plane information associated with the second data session from the second UPF.

6. The method of claim 1, wherein the first data session is established as a first protocol data unit (PDU) session with the first UPF.

7. The method of claim 1, wherein the request includes a first data session correlation identification.

8. A method for wireless communication, comprising:
 determining, by a Session Management Function (SMF) of a network, that a user plane of a first data session of a user equipment (UE) is to be relocated away from a first user plane function (UPF);
 based on the determination that the user plane of the first data session of the user equipment is to be relocated away from the first UPF, sending, via an Access and Mobility Management Function (AMF) of the network to the UE, a network access stratum (NAS) message comprising a request to establish a second data session; and
 performing a user plane relocation of the first data session via establishing the second data session at a second UPF.

9. The method of claim 8, wherein the request to establish the second data session includes a first data session correlation identification.

10. A method for wireless communication, comprising:
 determining that a user plane of a first data session of a user equipment (UE) is to be relocated away from a first user plane function (UPF); and
 performing a user plane relocation of the first data session via establishing a second data session at a second UPF, wherein performing the user plane relocation comprises:
  receiving a request from the UE to establish the second data session, the request including a first data session identification;
  determining that the request requires a UPF relocation away from the first UPF serving the first data session based at least in part on the first data session identification provided by the UE; and
  establishing the second data session with the second UPF.

11. The method of claim 10, wherein determining that the request requires the UPF relocation comprises:
 receiving, in the request from the UE, a cause indication that the second data session establishment is for a user plane relocation.

12. The method of claim 8, further comprising:
 establishing a connection with the second UPF.

13. The method of claim 12, further comprising:
 transmitting, to the UE, user plane information associated with the second data session and the second UPF.

14. The method of claim 8, wherein the method is performed at a session management function (SMF) of a network.

15. An apparatus for wireless communication, comprising:
 a processor;
 memory coupled with the processor; and
 instructions stored in the memory and executable by the processor to cause the apparatus to:
  establish, by a user equipment (UE), a first data session with a first user plane function (UPF) of a network;
  receive, at the UE via an Access and Mobility Management Function (AMF) of the network, a network access stratum (NAS) message comprising a request to establish a second data session with the network, the NAS message sent by a Session Management Function (SMF) of the network based on a determination that a user plane function (UPF) relocation is to be performed; and
  establish, by the UE and in response to receiving NAS message that comprises the request to establish the second data session with the network and which was sent by the SMF of the network based on the determination that the UPF relocation is to be performed, the second data session with a second UPF of the network.

16. The apparatus of claim 15, wherein the instructions are further executable by the processor to cause the apparatus to:
 release, after the establishing the second data session, the first data session with the first UPF.

17. The apparatus of claim 15, wherein the instructions to establish the second data session are executable by the processor to cause the apparatus to:
 transmit to the network a protocol data unit (PDU) session establishment request for establishment of the second data session that includes a data session identification associated with the first data session.

18. The apparatus of claim 17, wherein the instructions to establish the second data session with the second UPF further are executable by the processor to cause the apparatus to:
 transmit an indication that the PDU session establishment request is for a user plane relocation.

19. The apparatus of claim 18, wherein the instructions are further executable by the processor to cause the apparatus to:
 receive a confirmation from the network that the second data session is established; and
 receive user plane information associated with the second data session from the second UPF.

20. The apparatus of claim 15, wherein the first data session is established as a first protocol data unit (PDU) session with the first UPF.

21. The apparatus of claim 15, wherein the request includes a first data session correlation identification.

22. An apparatus for wireless communication, comprising:
 a processor;
 memory coupled with the processor; and
 instructions stored in the memory and executable by the processor to cause the apparatus to:
  determine that a user plane of a first data session of a user equipment (UE) is to be relocated away from a first user plane function (UPF); and
  based on the determination that the user plane of the first data session of the user equipment is to be relocated away from the first UPF, sending, via an Access and Mobility Management Function (AMF) of the network to the UE, a network access stratum (NAS) message comprising a request to establish a second data session; and
  perform a user plane relocation of the first data session via establishing the second data session at a second UPF.

23. The apparatus of claim 22, wherein the request to establish the second data session includes a first data session correlation identification.

24. An apparatus for wireless communication, comprising:
 a processor;
 memory coupled with the processor; and
 instructions stored in the memory and executable by the processor to cause the apparatus to:
  determine that a user plane of a first data session of a user equipment (UE) is to be relocated away from a first user plane function (UPF); and
  perform a user plane relocation of the first data session via establishing a second data session at a second UPF, wherein the instructions to perform the user plane relocation are executable by the processor to cause the apparatus to:

receive a request from the UE to establish the second data session, the request including a first data session identification;

determine that the request requires a UPF relocation away from the first UPF serving the first data session based at least in part on the first data session identification provided by the UE; and establish the second data session with the second UPF.

25. The apparatus of claim 24, wherein the instructions to determine that the request requires the UPF relocation are executable by the processor to cause the apparatus to:

receive, in the request from the UE, a cause indication that the second data session establishment is for a user plane relocation.

26. The apparatus of claim 22, wherein the instructions are further executable by the processor to cause the apparatus to:

establish a connection with the second UPF.

27. A method for wireless communication, comprising: by a user equipment:

establishing a first protocol data unit (PDU) session with a first user plane function (UPF) of a network;

receiving, via an Access and Mobility Management Function (AMF) of the network, a network access stratum (NAS) message comprising a request to establish a second protocol data unit (PDU) session with the network, the NAS message sent by a Session Management Function (SMF) of the network based on a determination that a user plane function (UPF) relocation is to be performed; and in response to receiving the NAS message that comprises the request to establish the second PDU session with the network and which was sent by the SMF of the network based on the determination that the UPF relocation is to be performed, sending a protocol data unit (PDU) session establishment request configured to establish the second PDU session with a second UPF of the network to the AMF of the network, the protocol data unit (PDU) session establishment request configured to establish the second PDU session with the second UPF of the network including a protocol data unit (PDU) session identifier (ID) of the first PDU session, the AMF configured to, based on the PDU session ID of the first PDU session included in the PDU session establishment request configured to establish the second PDU session with the second UPF of the network, forward the PDU session establishment request configured to establish the second PDU session with the second UPF of the network to the SMF of the network.

28. The method of claim 27, further comprising:
releasing, after the second PDU session is established, the first PDU session with the first UPF.

29. The method of claim 27, further comprising:
releasing, before the second PDU session is established, the first PDU session with the first UPF.

30. The method of claim 1, further comprising:
releasing, before the second data session is established, the first data session with the first UPF.

31. An apparatus for wireless communication, comprising:

a processor;

memory coupled with the processor; and instructions stored in the memory and executable by the processor to cause the apparatus to:

establish a first protocol data unit (PDU) session with a first user plane function (UPF) of a network;

receive, via an Access and Mobility Management Function (AMF) of the network, a network access stratum (NAS) message comprising a request to establish a second protocol data unit (PDU) session with the network, the NAS message sent by a Session Management Function (SMF) of the network based on a determination that a user plane function (UPF) relocation is to be performed; and in response to receiving the NAS message that comprises the request to establish the second PDU session with the network and which was sent by the SMF of the network based on the determination that the UPF relocation is to be performed, send a protocol data unit (PDU) session establishment request configured to establish the second PDU session with a second UPF of the network to the AMF of the network, the protocol data unit (PDU) session establishment request configured to establish the second PDU session with the second UPF of the network including a protocol data unit (PDU) session identifier (ID) of the first PDU session, the AMF configured to, based on the PDU session ID of the first PDU session included in the PDU session establishment request configured to establish the second PDU session with the second UPF of the network, forward the PDU session establishment request configured to establish the second PDU session with the second UPF of the network to the SMF of the network.

32. The apparatus of claim 31, wherein the instructions are further executable by the processor to cause the apparatus to:

release, after the second PDU session is established, the first PDU session with the first UPF.

33. The apparatus of claim 31, wherein the instructions are further executable by the processor to cause the apparatus to:

release, before the second PDU session is established, the first PDU session with the first UPF.

34. An apparatus for wireless communication, comprising:

means for establishing a first protocol data unit (PDU) session with a first user plane function (UPF) of a network;

means for receiving, via an Access and Mobility Management Function (AMF) of the network, a network access stratum (NAS) message comprising a request to establish a second protocol data unit (PDU) session with the network, the NAS message sent by a Session Management Function (SMF) of the network based on a determination that a user plane function (UPF) relocation is to be performed; and means for, in response to receiving the NAS message that comprises the request to establish the second PDU session with the network and which was sent by the SMF of the network based on the determination that the UPF relocation is to be performed, sending a protocol data unit (PDU) session establishment request configured to establish the second PDU session with a second UPF of the network to the AMF of the network,
the protocol data unit (PDU) session establishment request configured to establish the second PDU session with the second UPF of the network including a protocol data unit (PDU) session identifier (ID) of the first PDU session,
the AMF configured to, based on the PDU session ID of the first PDU session included in the PDU session establishment request configured to establish the second PDU session with the second UPF of the network, forward the PDU session establishment request configured to establish the second PDU session with the second UPF of the network to the SMF of the network.

35. The apparatus of claim 34, further comprising:
means for releasing, after the second PDU session is established, the first PDU session with the first UPF.

36. The apparatus of claim 34, further comprising:
means for releasing, before the second PDU session is established, the first PDU session with the first UPF.

37. A non-transitory computer-readable medium storing code for wireless communication, the code comprising instructions executable by a processor to:
establish a first protocol data unit (PDU) session with a first user plane function (UPF) of a network;
receive, via an Access and Mobility Management Function (AMF) of the network, a network access stratum (NAS) message comprising a request to establish a second protocol data unit (PDU) session with the network, the NAS message sent by a Session Management Function (SMF) of the network based on a determination that a user plane function (UPF) relocation is to be performed; and
in response to receiving the NAS message that comprises the request to establish the second PDU session with the network and which was sent by the SMF of the network based on the determination that the UPF relocation is to be performed, send a protocol data unit (PDU) session establishment request configured to establish the second PDU session with a second UPF of the network to the AMF of the network,
the protocol data unit (PDU) session establishment request configured to establish the second PDU session with the second UPF of the network including a protocol data unit (PDU) session identifier (ID) of the first PDU session,
the AMF configured to, based on the PDU session ID of the first PDU session included in the PDU session establishment request configured to establish the second PDU session with the second UPF of the network, forward the PDU session establishment request configured to establish the second PDU session with the second UPF of the network to the SMF of the network.

38. The non-transitory computer-readable medium of claim 37, wherein the instructions are further executable by the processor to:
release, after the second PDU session is established, the first PDU session with the first UPF.

39. The non-transitory computer-readable medium of claim 37, wherein the instructions are further executable by the processor to:
release, before the second PDU session is established, the first PDU session with the first UPF.

40. A method for wireless communication, comprising: by a user equipment:
establishing a first protocol data unit (PDU) session with a first user plane function (UPF) of a network;
receiving, via an Access and Mobility Management Function (AMF) of the network, a network access stratum (NAS) message comprising a request to establish a second protocol data unit (PDU) session with the network, the NAS message sent by a Session Management Function (SMF) of the network based on a determination that a user plane function (UPF) relocation is to be performed; and
in response to receiving the NAS message that comprises the request to establish the second PDU session with the network and which was sent by the SMF of the network based on the determination that the UPF relocation is to be performed, sending a protocol data unit (PDU) session establishment request configured to establish the second PDU session with a second UPF of the network to the AMF of the network,
the protocol data unit (PDU) session establishment request configured to establish the second PDU session with the second UPF of the network including a protocol data unit (PDU) session identifier (ID) of the first PDU session.

41. The method of claim 40, further comprising:
releasing, after the second PDU session is established, the first PDU session with the first UPF.

42. The method of claim 40, further comprising:
releasing, before the second PDU session is established, the first PDU session with the first UPF.

43. An apparatus for wireless communication, comprising:
a processor;
memory coupled with the processor; and
instructions stored in the memory and executable by the processor to cause the apparatus to:
establish a first protocol data unit (PDU) session with a first user plane function (UPF) of a network;
receive, via an Access and Mobility Management Function (AMF) of the network, a network access stratum (NAS) message comprising a request to establish a second protocol data unit (PDU) session with the network, the NAS message sent by a Session Management Function (SMF) of the network based on a determination that a user plane function (UPF) relocation is to be performed; and
in response to receiving the NAS message that comprises the request to establish the second PDU session with the network and which was sent by the SMF of the network based on the determination that the UPF relocation is to be performed, send a protocol data unit (PDU) session establishment request configured to establish the second PDU session with a second UPF of the network to the AMF of the network,
the protocol data unit (PDU) session establishment request configured to establish the second PDU session with the second UPF of the network including a protocol data unit (PDU) session identifier (ID) of the first PDU session.

44. The apparatus of claim 43, wherein the instructions are further executable by the processor to cause the apparatus to:
release, after the second PDU session is established, the first PDU session with the first UPF.

45. The apparatus of claim 43, wherein the instructions are further executable by the processor to cause the apparatus to:

release, before the second PDU session is established, the first PDU session with the first UPF.

46. An apparatus for wireless communication, comprising:

means for establishing a first protocol data unit (PDU) session with a first user plane function (UPF) of a network;

means for receiving, via an Access and Mobility Management Function (AMF) of the network, a network access stratum (NAS) message comprising a request to establish a second protocol data unit (PDU) session with the network, the NAS message sent by a Session Management Function (SMF) of the network based on a determination that a user plane function (UPF) relocation is to be performed; and means for, in response to receiving the NAS message that comprises the request to establish the second PDU session with the network and which was sent by the SMF of the network based on the determination that the UPF relocation is to be performed, sending a protocol data unit (PDU) session establishment request configured to establish the second PDU session with a second UPF of the network to the AMF of the network, the protocol data unit (PDU) session establishment request configured to establish the second PDU session with the second UPF of the network including a protocol data unit (PDU) session identifier (ID) of the first PDU session.

47. The apparatus of claim 46, further comprising:

means for releasing, after the second PDU session is established, the first PDU session with the first UPF.

48. The apparatus of claim 46, further comprising:

means for releasing, before the second PDU session is established, the first PDU session with the first UPF.

49. A non-transitory computer-readable medium storing code for wireless communication, the code comprising instructions executable by a processor to:

establish a first protocol data unit (PDU) session with a first user plane function (UPF) of a network;

receive, via an Access and Mobility Management Function (AMF) of the network, a network access stratum (NAS) message comprising a request to establish a second protocol data unit (PDU) session with the network, the NAS message sent by a Session Management Function (SMF) of the network based on a determination that a user plane function (UPF) relocation is to be performed; and in response to receiving the NAS message that comprises the request to establish the second PDU session with the network and which was sent by the SMF of the network based on the determination that the UPF relocation is to be performed, send a protocol data unit (PDU) session establishment request configured to establish the second PDU session with a second UPF of the network to the AMF of the network, the protocol data unit (PDU) session establishment request configured to establish the second PDU session with the second UPF of the network including a protocol data unit (PDU) session identifier (ID) of the first PDU session.

50. The non-transitory computer-readable medium of claim 49, wherein the instructions are further executable by the processor to:

release, after the second PDU session is established, the first PDU session with the first UPF.

51. The non-transitory computer-readable medium of claim 49, wherein the instructions are further executable by the processor to:

release, before the second PDU session is established, the first PDU session with the first UPF.

52. The apparatus of claim 15, wherein the instructions are further executable by the processor to cause the apparatus to:

release, before the second PDU session is established, the first PDU session with the first UPF.

53. An apparatus for wireless communication, comprising:

means for establishing, by a user equipment (UE), a first data session with a first user plane function (UPF) of a network;

means for receiving, at the UE via an Access and Mobility Management Function (AMF) of the network, a network access stratum (NAS) message comprising a request to establish a second data session with the network, the NAS message sent by a Session Management Function (SMF) of the network based on a determination that a user plane function (UPF) relocation is to be performed; and means for establishing, by the UE and in response to receiving the NAS message that comprises the request to establish the second data session with the network and which was sent by the SMF of the network based on the determination that the UPF relocation is to be performed, the second data session with a second UPF of the network.

54. The apparatus of claim 53, further comprising:

means for releasing, after establishing the second data session, the first data session with the first UPF.

55. The apparatus of claim 53, wherein the means for establishing the second data session comprises:

means for transmitting to the network a protocol data unit (PDU) session establishment request for establishment of the second data session that includes a data session identification associated with the first data session.

56. The apparatus of claim 53, wherein the first data session is established as a first protocol data unit (PDU) session with the first UPF.

57. The apparatus of claim 53, further comprising:

means for releasing, before the second data session is established, the first PDU session with the first UPF.

58. A non-transitory computer-readable medium storing code for wireless communication, the code comprising instructions executable by a processor to:

establish, by a user equipment (UE), a first data session with a first user plane function (UPF) of a network;

receive, at the UE via an Access and Mobility Management Function (AMF) of the network, a network access stratum (NAS) message comprising a request to establish a second data session with the network, the NAS message sent by a Session Management Function (SMF) of the network based on a determination that a user plane function (UPF) relocation is to be performed; and establish, by the UE and in response to receiving the NAS message that comprises the request to establish the second data session with the network and which was sent by the SMF of the network based on the determination that the UPF relocation is to be performed, the second data session with a second UPF of the network.

59. The non-transitory computer-readable medium of claim 58, wherein the instructions are further executable by the processor to:

release, after establishing the second data session, the first data session with the first UPF.

60. The non-transitory computer-readable medium of claim 58, wherein establishing the second data session comprises:

transmitting to the network a protocol data unit (PDU) session establishment request for establishment of the second data session that includes a data session identification associated with the first data session.

61. The non-transitory computer-readable medium of claim 58, wherein the first data session is established as a first protocol data unit (PDU) session with the first UPF.

62. The non-transitory computer-readable medium of claim 58, wherein the instructions are further executable by the processor to:

release, before establishing the second data session, the first data session with the first UPF.

63. An apparatus for wireless communication, comprising:

means for determining, by a Session Management Function (SMF) of a network, that a user plane of a first data session of a user equipment (UE) is to be relocated away from a first user plane function (UPF);

means for, based on the determination that the user plane of the first data session of the user equipment is to be relocated away from the first UPF, sending, via an Access and Mobility Management Function (AMF) of the network to the UE, a network access stratum (NAS) message comprising a request to establish a second data session; and means for performing a user plane relocation of the first data session via establishing the second data session at a second UPF.

64. A non-transitory computer-readable medium storing code for wireless communication, the code comprising instructions executable by a processor to:

determine, by a Session Management Function (SMF) of a network, that a user plane of a first data session of a user equipment (UE) is to be relocated away from a first user plane function (UPF);

based on the determination that the user plane of the first data session of the user equipment is to be relocated away from the first UPF, send, via an Access and Mobility Management Function (AMF) of the network to the UE, a network access stratum (NAS) message comprising a request to establish a second data session; and perform a user plane relocation of the first data session via establishing the second data session at a second UPF.

* * * * *